United States Patent
Minagawa

(10) Patent No.: US 7,322,896 B2
(45) Date of Patent: Jan. 29, 2008

(54) HYBRID TRANSMISSION

(75) Inventor: Yuusuke Minagawa, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 341 days.

(21) Appl. No.: 10/982,885

(22) Filed: Nov. 8, 2004

(65) Prior Publication Data

US 2005/0107199 A1    May 19, 2005

(30) Foreign Application Priority Data

Nov. 18, 2003    (JP)    .............................. 2003-387932

(51) Int. Cl.
F16H 3/72    (2006.01)

(52) U.S. Cl. ........................................................ 475/5

(58) Field of Classification Search ............... 475/5, 475/221, 223; 477/2, 3; 180/65.2, 65.3, 180/65.4, 248, 233
See application file for complete search history.

(56) References Cited

U.S. PATENT DOCUMENTS

| | | | | |
|---|---|---|---|---|
| 1,984,830 | A * | 12/1934 | Higley | 475/21 |
| 3,799,284 | A * | 3/1974 | Hender | 180/65.2 |
| 5,120,282 | A * | 6/1992 | Fjallstrom | 475/5 |
| 5,168,946 | A * | 12/1992 | Dorgan | 180/6.44 |
| 5,935,035 | A * | 8/1999 | Schmidt | 475/5 |
| 6,491,599 | B1 * | 12/2002 | Schmidt | 475/5 |
| 6,579,201 | B2 * | 6/2003 | Bowen | 475/5 |
| 6,595,884 | B1 * | 7/2003 | Ai et al. | 475/5 |
| 6,732,526 | B2 * | 5/2004 | Minagawa et al. | 60/706 |
| 7,172,524 | B2 * | 2/2007 | Moeller | 475/5 |
| 2002/0045507 | A1 | 4/2002 | Bowen | |
| 2002/0160874 | A1 | 10/2002 | Bowen et al. | |
| 2003/0104892 | A1 | 6/2003 | Porter | |
| 2003/0136597 | A1 | 7/2003 | Raftari et al. | |

FOREIGN PATENT DOCUMENTS

| | | |
|---|---|---|
| DE | 196 06 771 A1 | 8/1997 |
| DE | 199 09 424 A1 | 8/2000 |
| EP | 1 279 543 A2 | 1/2003 |
| EP | 1 321 646 A1 | 6/2003 |
| EP | 1 342 603 A2 | 9/2003 |
| JP | 11-332019 A | 11/1999 |
| JP | 2003-032808 A | 1/2003 |
| JP | 2003-247613 A | 9/2003 |
| JP | 2005-029063 A | 2/2005 |
| JP | 2005-029118 A | 2/2005 |
| JP | 2005161971 A * | 6/2005 |

* cited by examiner

*Primary Examiner*—Roger Pang
(74) *Attorney, Agent, or Firm*—Foley & Lardner LLP

(57) ABSTRACT

A hybrid transmission for a four-wheel drive hybrid vehicle. A simple planetary gearset as a front planetary gearset and a double-pinion planetary gearset as a rear planetary gearset are mounted in a rear section of a transmission housing. A pair of motor/generators are mounted in a front section of the transmission housing nearer to an engine. A first planet-pinion carrier is connected to a second planet-pinion carrier, and to an engine input shaft via an engine clutch. A tubular first ring gear is connected to a first output shaft for driving a front axle. A second ring gear is connected to a second output shaft for driving a rear axle. The second output shaft extends through a bore of the first output shaft. A first sun gear is connected to the first motor/generator. A second sun gear is connected to the second motor/generator.

25 Claims, 12 Drawing Sheets

HYBRID TRANSMISSION

BACKGROUND OF THE INVENTION

The present invention relates generally to hybrid transmissions suitable for hybrid electric vehicles (HEVs) equipped with a prime mover such as an internal combustion engine (ICE) and with a motor/generator, and more particularly to a hybrid transmission for a four-wheel drive vehicle, including a differential mechanism connected between a prime mover and a motor/generator for continuously variable speed control.

A Published Japanese Patent Application Publication No. H11(1999)-332019 (hereinafter referred to as "JP11-332019") shows a four-wheel drive hybrid vehicle. This hybrid vehicle includes a hybrid transmission to receive inputs from an engine and from an electric motor, and to output a driving torque to a first drive axle, and an additional electric motor mounted at a second drive axle, to drive the second drive axle.

SUMMARY OF THE INVENTION

In the hybrid vehicle of JP11-332019, the additional electric motor outside the hybrid transmission is employed, and is connected to a power supply, to construct a four-wheel drive mechanism. This mechanism bears the following disadvantages. First, the increase in the number of parts leads to a cost disadvantage. Second, the floor of the vehicle body needs to include an additional housing space in which the additional electric motor and associated components such as an inverter are mounted. This leads to a decrease in the interior space of the vehicle, and also to redesign of the floor of the vehicle specially for a four-wheel drive model in addition to a two-wheel drive model. Third, the maximum driving power for the second drive axle depends on the capacity of the additional motor. Accordingly, the second drive axle is not a main source of driving power. The first drive axle driven by the hybrid transmission connected to the engine is employed as a main drive axle. Therefore, this conventional technique produces a four-wheel drive hybrid vehicle only based on a two-wheel drive vehicle as a basic structure. In addition, there is a low flexibility in distribution of driving power or driving torque.

It is an object of the present invention to provide a hybrid transmission for establishing an arbitrary gear ratio in a stable condition where a lever representing the operating state of the hybrid transmission is in balance, and for distributing a driving power to two drivelines.

According to one aspect of the present invention, a hybrid transmission for a hybrid vehicle mounting thereon three motors including an engine, a first electric motor/generator, and a second electric motor/generator, the hybrid transmission comprises a first output shaft, a second output shaft, a first differential device with two degrees of freedom, including a first rotating member, a second rotating member, and a third rotating member, a second differential device with two degrees of freedom, including a first rotating member, a second rotating member, and a third rotating member, the first rotating member of the first differential device connected to the first rotating member of the second differential device, and to a first one of the three motors, the second rotating member of the first differential device connected to the first output shaft, the second rotating member of the second differential device connected to the second output shaft, the third rotating member of the first differential device connected to a second one of the three motors, and the third rotating member of the second differential device connected to a third one of the three motors.

According to another aspect of the invention, a hybrid transmission for a hybrid vehicle mounting thereon three motors including an engine, a first electric motor/generator, and a second electric motor/generator, the hybrid transmission comprises a first output shaft, a second output shaft, first differential means for including a first rotating member, a second rotating member, and a third rotating member with two degrees of freedom, second differential means for including a first rotating member, a second rotating member, and a third rotating member with two degrees of freedom, the first rotating member of the first differential means connected to the first rotating member of the second differential means, and to a first one of the three motors, the second rotating member of the first differential means connected to the first output shaft, the second rotating member of the second differential means connected to the second output shaft, the third rotating member of the first differential means connected to a second one of the three motors, and the third rotating member of the second differential means connected to a third one of the three motors.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
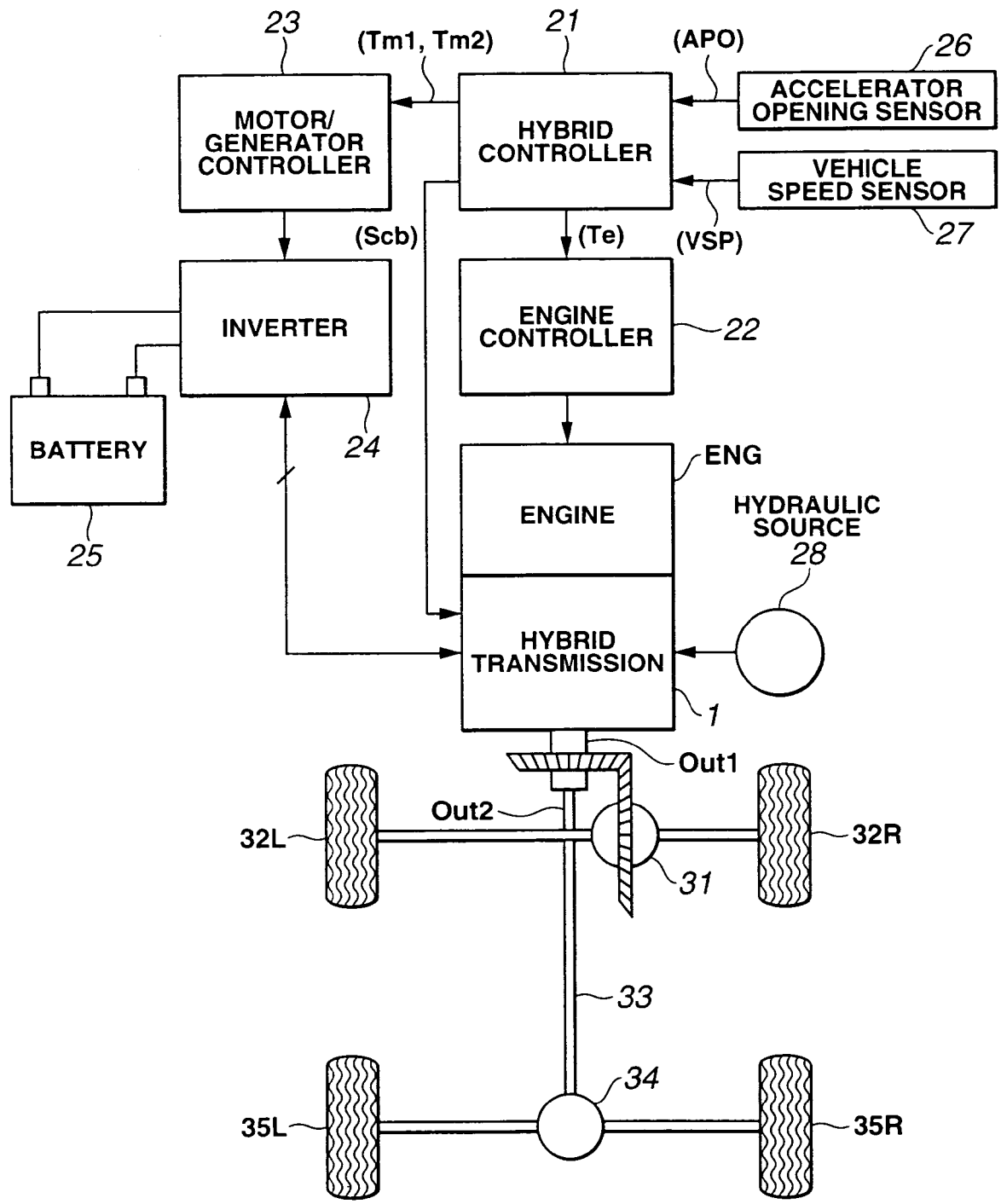
FIG. 1 is a schematic diagram showing a top view of a hybrid vehicle mounting thereon a hybrid transmission, and a control system of the hybrid transmission, in accordance with an embodiment of the present invention.
Figure 2:
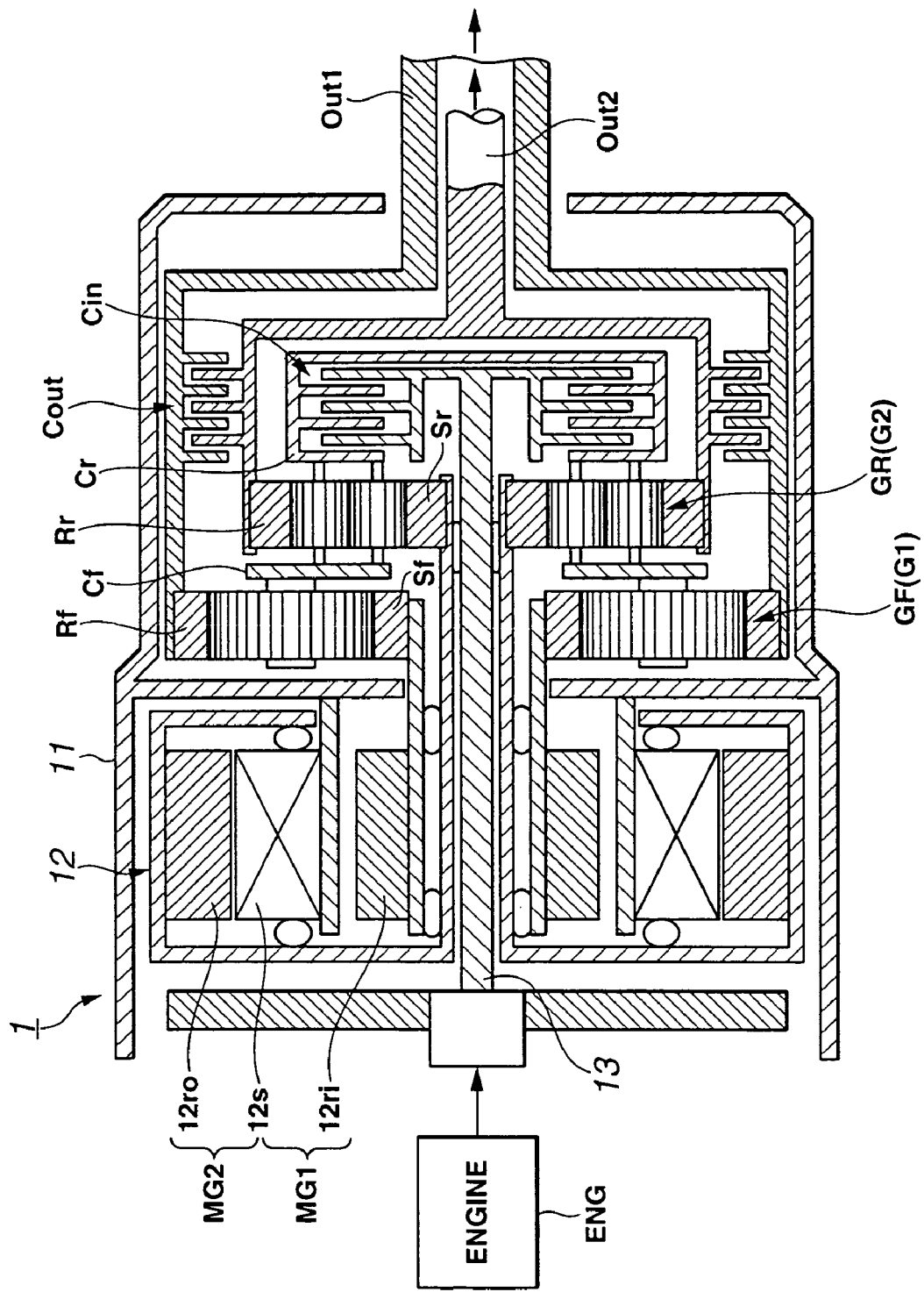
FIG. 2 is a schematic diagram showing a longitudinal sectional view of a hybrid transmission in accordance with a first embodiment of the present invention.

FIG. 1 is a schematic diagram depicting a front-engine, four-wheel drive hybrid vehicle mounting thereon a hybrid transmission 1, and a control system of hybrid transmission 1, in accordance with an embodiment of the present invention. FIG. 2 shows a detailed presentation of the structure of hybrid transmission 1.

As shown in FIG. 2, hybrid transmission 1 includes a transmission housing 11 formed into a tubular shape. Transmission housing 11 houses two planetary gearsets in a rear section located far from an engine ENG in the axial direction (on the right side in the horizontal direction in FIG. 2). More specifically, a front planetary gearset GF is mounted nearer to engine ENG, and a rear planetary gearset GR is mounted farer from engine ENG. Both of the planetary gearsets are mounted coaxially with transmission housing 11. In a front section of transmission housing 11 which is nearer to engine ENG (on the left side in FIG. 2), a pair of motor/generators such as a compound-current double-layer motor 12 is mounted coaxially with planetary gearsets GF, GR, or with transmission housing 11.

Front planetary gearset GF is a simple planetary gearset, serving as a first differential device G1 including three major rotating members with two degrees of freedom. Rear planetary gearset GR is a double pinion planetary gearset, serving as a second differential device G2 including three major rotating members with two degrees of freedom. More specifically, front planetary gearset GF includes three major rotating members of a first sun gear Sf as a third rotating member, a first ring gear Rf as a second rotating member, and a first planet-pinion carrier Cf as a first rotating member. Rear planetary gearset GR includes three major rotating members of a second sun gear Sr as a third rotating member, a second ring gear Rr as a second rotating member, and a second planet-pinion carrier Cr as a first rotating member. First planet-pinion carrier Cf is rigidly coupled to second planet-pinion carrier Cr for rotation therewith. Rotation of engine ENG is input to an input shaft 13. Between input shaft 13 and second planet-pinion carrier Cr is selectively connected an engine clutch Cin.

First ring gear Rf is connected to a tubular first output shaft Out1 mounted coaxially with input shaft 13 and extending outward through the rear end of transmission housing 11. Second ring gear Rr is connected to a second output shaft Out2 extending through the bore of first output shaft Out1 and outward through the rear end of transmission housing 11. Between first output shaft Out1 and second output shaft Out2 is selectively connected an output clutch Cout, to regulate the relative rotation between them to zero.

Compound-current double-layer motor 12 includes a pair of rotors including an inner rotor 12ri and an outer rotor 12ro of an annular shape surrounding inner rotor 12ri each coaxially and rotatably supported on a front section of transmission housing 11, and a stator 12s fixed with reference to transmission housing 11 and disposed in an annular space defined between inner rotor 12ri and outer rotor 12ro. Thus, stator 12s and inner rotor 12ri serve for a first motor/generator MG1, and stator 12s and outer rotor 12ro serve for a second motor/generator MG2. Motor/generators MG1, MG2 each function as a motor that during a compound current being supplied, outputs a rotational speed (including zero) in a direction in accordance with the supplied current, or each function as a generator that during an external torque being applied, outputs a power in accordance with a rotational speed by the external torque. First motor/generator MG1 (or inner rotor 12ri) is connected to first sun gear Sf. Second motor/generator MG2 (or outer rotor 12ro) is connected to second sun gear Sr.

Configured as discussed above, hybrid transmission 1 is mounted in a longitudinal position coaxially with, and on the rear end of, engine ENG, as shown in FIG. 1. First output shaft Out1 is drivingly connected to left and right front wheels 32L and 32R via a front differential gear mechanism 31. Second output shaft Out2 is drivingly connected to left and right rear wheels 35L and 35R via a propeller shaft 33 and a rear differential gear mechanism 34.

The following describes the control system of engine ENG and hybrid transmission 1. The control system includes a hybrid controller 21 to integrally control engine ENG and hybrid transmission 1 (including motor/generators MG1, MG2). More specifically, hybrid controller 21 issues a command to an engine controller 22 to adjust output torque Te of engine ENG to a target torque. Hybrid controller 21 also issues commands to a motor/generator controller 23 to adjust output torques Tm1, Tm2 of motor/generators MG1, MG2 to target torques. Motor/generator controller 23 controls motor/generators MG1, MG2 via an inverter 24 and via a battery 25 to adjust output torques Tm1, Tm2 to target torques. In addition, hybrid controller 21 issues a signal Scb to hybrid transmission 1 to selectively engage and release torque-transmitting mechanisms such as an engine clutch Cin and an output clutch Cout (and a brake in another embodiment). Hybrid transmission 1 selectively engages and releases engine clutch Cin and output clutch Cout, using hydraulic pressure supplied by a hydraulic source 28, in accordance with signal Scb. On the other hand, hybrid controller 21 receives information needed to determine the control method. The information includes a signal of accelerator opening APO output from an accelerator opening sensor 26, a signal of a vehicle speed VSP output from a vehicle speed sensor 27.

Figure 3:
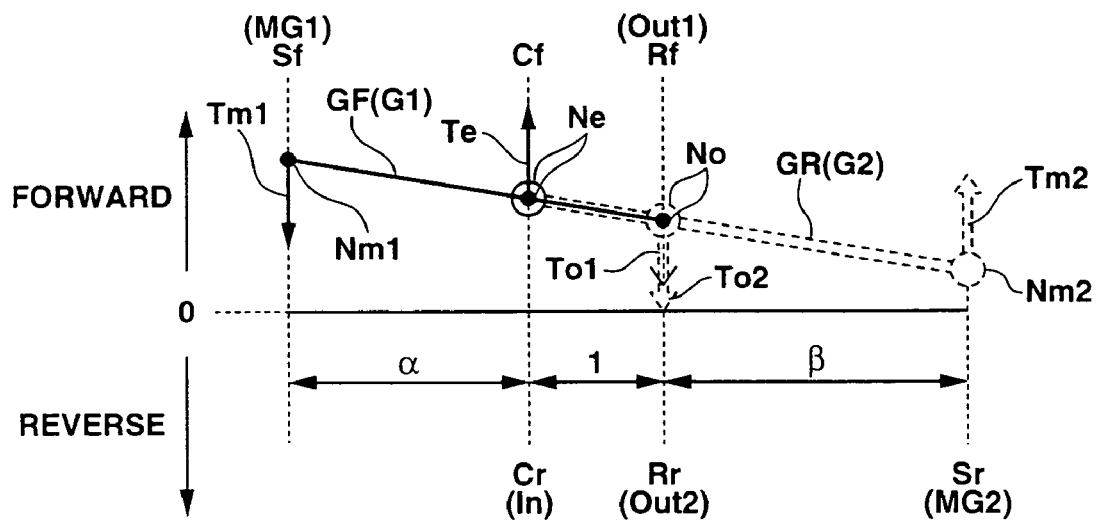
FIG. 3 is a lever diagram showing a state in which the hybrid transmission of FIG. 2 operates in a medium speed range.

FIG. 3 shows a lever diagram in accordance with an operating state of hybrid transmission 1 of FIG. 2. In front planetary gearset GF as first differential device G1, the rotational speed varies monotonously in order of first sun gear Sf, first planet-pinion carrier Cf, and first ring gear Rf. In other words, first sun gear Sf, first planet-pinion carrier Cf, and first ring gear Rf have an extreme rotational speed, an intermediate rotational speed, and another extreme rotational speed, among the three rotating members of front planetary gearset GF, respectively. In rear planetary gearset GR as second differential device G2, the rotational speed varies monotonously in order of second planet-pinion carrier Cr, second ring gear Rr, and second sun gear Sr. In other words, second planet-pinion carrier Cr, second ring gear Rr, and second sun gear Sr have an extreme rotational speed, an intermediate rotational speed, and another extreme rotational speed, among the three rotating members of rear planetary gearset GR, respectively. First planet-pinion carrier Cf and second planet-pinion carrier Cr are coupled to each other. First ring gear Rf is connected to first output shaft Out1, while second ring gear Rr is connected to second output shaft Out2. Output clutch Cout selectively connects and disconnects first output shaft Out1 and second output shaft Out2, to establish and to release a differential lock. First sun gear Sf is connected to first motor/generator MG1 (or inner rotor 12ri). Second planet-pinion carrier Cr is connected to an input In from engine ENG (or input shaft 13) via engine clutch Cin. Second sun gear Sr is connected to second motor/generator MG2 (or outer rotor 12ro).

The lever diagram as shown in FIG. 3 represents an operating state of hybrid transmission 1. Relative distances between the rotating members along the horizontal axis of the lever diagram are determined by gear ratios between the rotating members of hybrid transmission 1. In the lever diagram, with the distance between first ring gear Rf and first planet-pinion carrier Cf (the distance between second ring gear Rr and second planet-pinion carrier Cr) set to 1 as a reference, the distance between first planet-pinion carrier Cf and first sun gear Sf is $\alpha$, and the distance between second ring gear Rr and second sun gear Sr is $\beta$. Positions along the vertical axis of the lever diagram indicate rotational speeds of the rotating members. A positive position above zero indicates a forward (normal) rotation, while a negative position below zero indicates a backward (reverse) rotation. In the lever diagram, torques such as torques Tm1, Tm2 of motor/generators MG1, MG2, engine torque Te, and torques To1, To2 of output shafts Out1, Out2, which are imposed on the associated rotating members, are indicated by vertical vectors. An upward vector indicates a torque to move upward the position (to positively increase the rotational speed) of a rotating member, while a downward vector indicates a torque to move downward the position (to decrease the rotational speed) of a rotating member.

Figure 4:
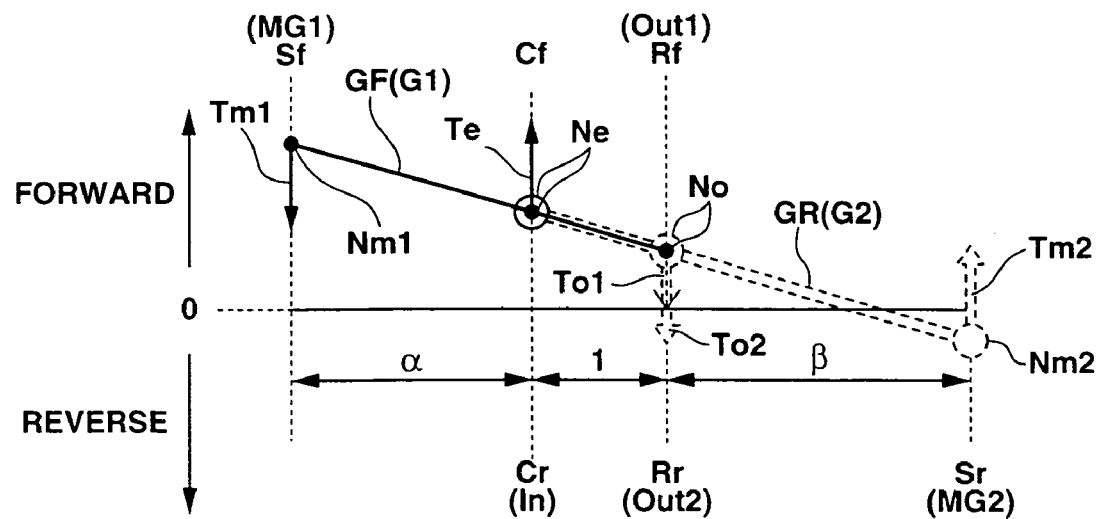
FIG. 4 is a lever diagram showing a state in which the hybrid transmission of FIG. 2 operates in a low speed range.
Figure 5:
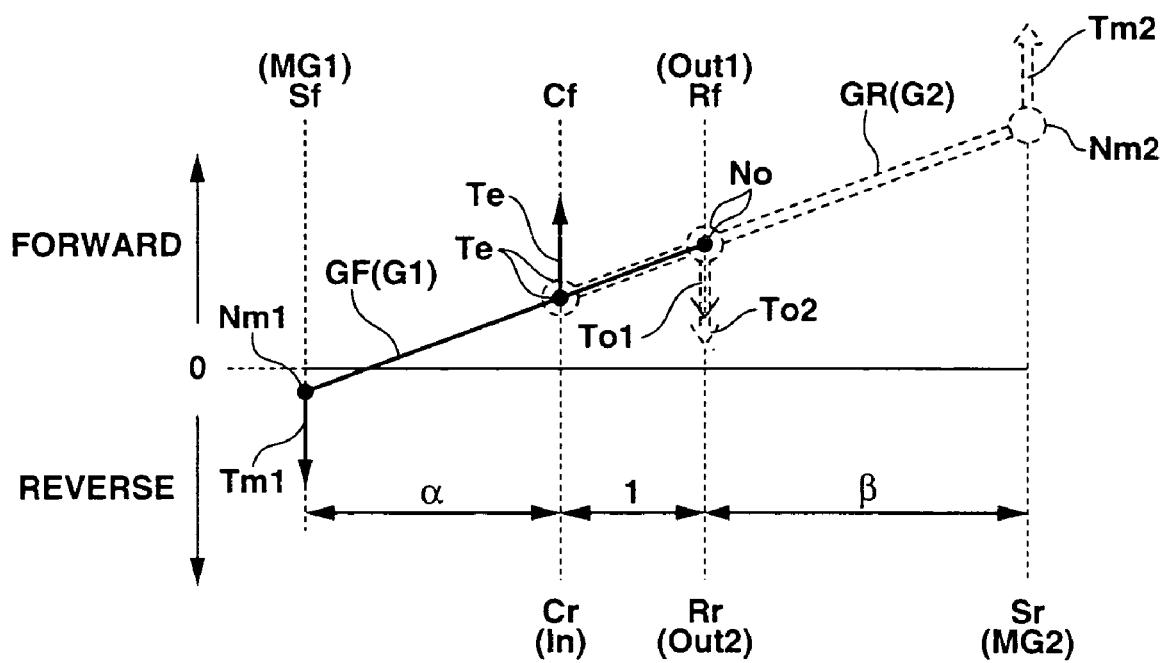
FIG. 5 is a lever diagram showing a state in which the hybrid transmission of FIG. 2 operates in a high speed range.

In the lever diagrams shown in FIGS. 3 through 5, front planetary gearset GF is indicated by lever GF (G1), and rear planetary gearset GR is indicated by lever GR (G2). While output shafts Out1 and Out2 rotate at a same rotational speed No, lever GF (G1) and lever GR (G2) are overlapped with each other to form a straight line, as shown in FIGS. 3 through 5. In the following discussion, output shafts Out1 and Out2 rotate at a same rotational speed No, so as to rotate the front and the rear wheels with no difference in the rotational speed.

The rotational speed and the torque of each rotating member is determined, so as to keep each of lever GF (G1) and lever GR (G2) in balance. The balance equations of rotational speeds and torques are the following equations (1) through (11):

$$Ne+\alpha \cdot (Ne-No)=Nm1 \quad (1)$$

$$No+\beta \cdot (No-Ne)=Nm2 \quad (2)$$

$$Te \cdot i=To \quad (3)$$

$$i=Ne/No \quad (4)$$

$$To=To1+To2 \quad (5)$$

$$Te=Te1+Te2 \quad (6)$$

$$Tm1+Te1=To1 \quad (7)$$

$$Tm2+Te2=To2 \quad (8)$$

$$Nm2 \cdot Tm2+Nm1 \cdot Tm1=Pb \quad (9)$$

$$\alpha \cdot Tm1+To1=0 \quad (10)$$

$$Te2=\alpha \cdot Tm2 \quad (11)$$

where Pb represents a battery power of battery 25, and driving torques To1, To2, and To are positive in the downward direction in the lever diagram.

The following equations (12) and (13), which are derived from equations (1) through (11) with Pb=0, are used to calculate torques Tm1, Tm2 of motor/generators MG1, MG2. Similarly, the following equations (14) and (15) are used to calculate driving torques To1, To2 of output shafts Out1, Out2. Signals corresponding to torques Tm1, Tm2, and Te are issued to motor/generator controller 23, and to engine controller 22, respectively, to provide a transmission state.

$$Tm1=-(Nm2 \cdot Te)/\{Nm2 \cdot (1+\alpha)+\beta \cdot Nm1\} \quad (12)$$

$$Tm2=(Nm1 \cdot Te \cdot i)/\{Nm1 \cdot (1+\beta)+\alpha \cdot Nm2\} \quad (13)$$

$$To1=-\alpha \cdot Tm1 \quad (14)$$

$$To2=(1+\alpha) \cdot Tm2 \quad (15)$$

In general, engine torque Te is a positive torque (driving torque) in a steady-state driving condition. On the other hand, driving torques To1, To2 are both represented by negative torques (loading torques) in a lever diagram, because reaction forces from the road surface is imposed on hybrid transmission 1 in the opposite direction of driving torques To1, To2. Equations (12) through (15) indicate that driving torques To1, To2 are negative values in some gear ratios. Actually, however, the balance of electric power is slightly shifted from Pb=0, so as to make driving torques To1, To2 positive. Accordingly, torques Tm1, Tm2 vary in accordance with a change in battery power Pb.

When the operating state of hybrid transmission 1 or the gear ratio of hybrid transmission 1 is in the condition shown in FIG. 3, the levers GF (G1) and GR (G2) need to be balanced in torques. As discussed above, engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to second sun gear Sr, are determined so as to balance lever GF (G1) and lever GR (G2). More specifically, torque Tm1 needs to be a negative torque or a generator torque biasing rotational speed Nm1 of first motor/generator MG1 downward toward zero. On the other hand, torque Tm2 needs to be a positive torque or a motor torque biasing rotational speed Nm2 of second motor/generator MG2 upward away from zero.

In this manner, first motor/generator MG1 functions as a generator, and second motor/generator MG2 functions as a motor. Even while electric power is not supplied from battery 25 (Pb=0), second motor/generator MG2 can be energized with a power generated by first motor/generator MG1, to keep the balances of rotational speeds and torques of the levers, in other words, to keep stable the operating state of hybrid transmission 1 as indicated by lever GF (G1) and lever GR (G2). If the operating state of hybrid transmission 1 is not retained without power supply from battery 25, the power balance between motor/generators MG1, MG2 is slightly shifted (Pb≠0) to keep the operating state of hybrid transmission 1.

When the operating state of hybrid transmission 1 or the gear ratio of hybrid transmission 1 is in the condition shown in FIG. 4, the levers GF (G1) and GR (G2) need to be balanced in torques. In this condition, rotational speed Nm2 of second motor/generator MG2 is set negative, to lower the rotational speeds of output shafts Out1, Out2. This operating state of hybrid transmission 1 produces a lower speed than in FIG. 3. As discussed above, engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to second sun gear Sr, are determined so as to balance lever GF (G1) and lever GR (G2). More specifically, torque Tm1 needs to be a negative torque or a generator torque biasing rotational speed Nm1 of first motor/generator MG1 downward toward zero. On the other hand, torque Tm2 needs to be a positive torque or a generator torque biasing rotational speed Nm2 of second motor/generator MG2 upward toward zero.

In this manner, first motor/generator MG1 and second motor/generator MG2 both function as a generator, to store the generated electric power in battery 25, and to keep the balances of rotational speeds and torques of the levers, in other words, to keep stable the operating state of hybrid transmission 1 as indicated by lever GF (G1) and lever GR (G2).

When the operating state of hybrid transmission 1 or the gear ratio of hybrid transmission 1 is in the condition shown in FIG. 5, the levers GF (G1) and GR (G2) need to be balanced in torques. In this condition, rotational speed Nm1 of first motor/generator MG1 is set negative, to lower the rotational speeds of output shafts Out1, Out2. This operating state of hybrid transmission 1 produces a higher speed than in FIGS. 3 and 4. As discussed above, engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to second sun gear Sr, are determined so as to balance lever GF (G1) and lever GR (G2). More specifically, torque Tm1 needs to be a negative torque or a motor torque biasing rotational speed Nm1 of first motor/generator MG1 downward away from zero. On the other hand, torque Tm2 needs to be a positive torque or a motor torque biasing rotational speed Nm2 of second motor/generator MG2 upward away from zero.

In this manner, first motor/generator MG1 and second motor/generator MG2 both function as a motor, consuming the electric power in battery 25, to keep the balances of rotational speeds and torques of the levers, in other words, to keep stable the operating state of hybrid transmission 1 as indicated by lever GF (G1) and lever GR (G2).

Figure 6:
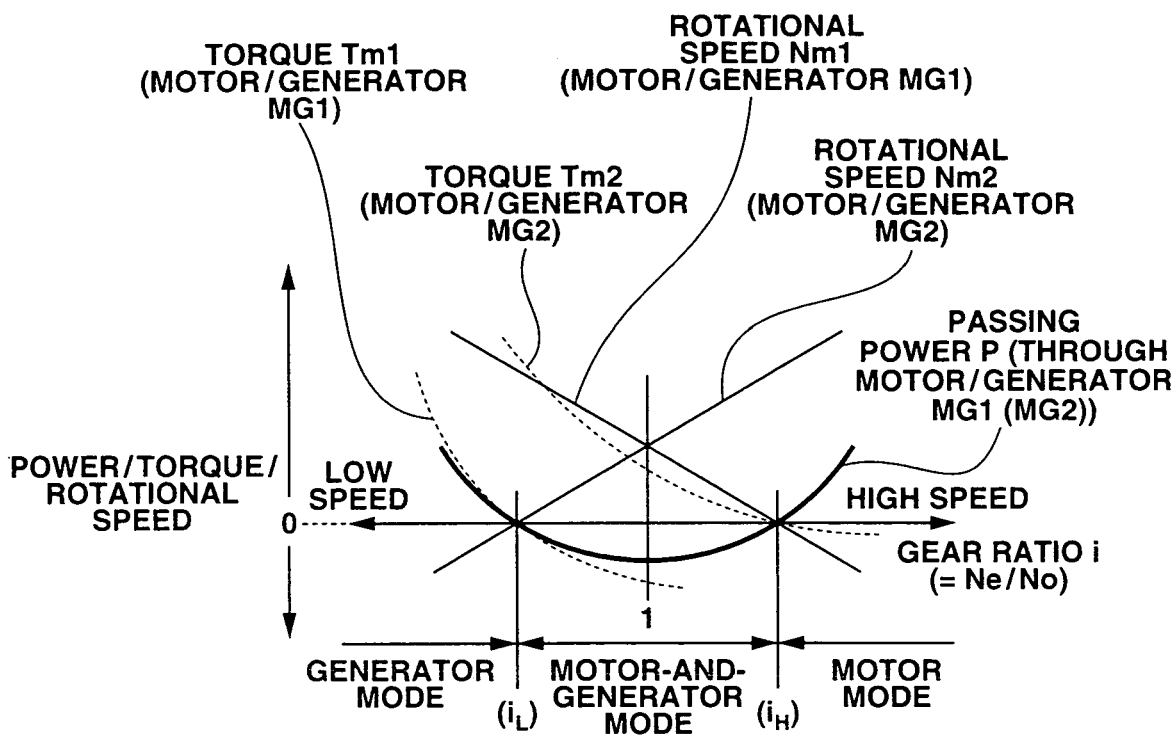
FIG. 6 is a characteristic diagram showing torques, and rotational speeds of, and a power passing through, first and second motor/generators of the hybrid transmission of FIG. 2, with respect to a gear ratio.

FIG. 6 shows changes in variables of the operating state of hybrid transmission 1 in accordance with a change in gear ratio i (Ne/No), in case Pb=0. The variables include rotational speeds Nm1, Nm2 and torques Tm1, Tm2 of motor/generators MG1, MG2, and a power passing through first motor/generator MG1. In case Pb=0, the power passing through second motor/generator MG2 has a sign opposite to and a same magnitude as the power passing through first motor/generator MG1. Passing power P is zero, at a gear ratio $i_L$ at which rotational speed Nm2 of second motor/generator MG2 is zero and torque Tm1 of first motor/generator MG1 is zero, and at a gear ratio $i_H$ at which torque Tm2 of second motor/generator MG2 is zero and rotational speed Nm1 of first motor/generator MG1 is zero.

Figure 7:
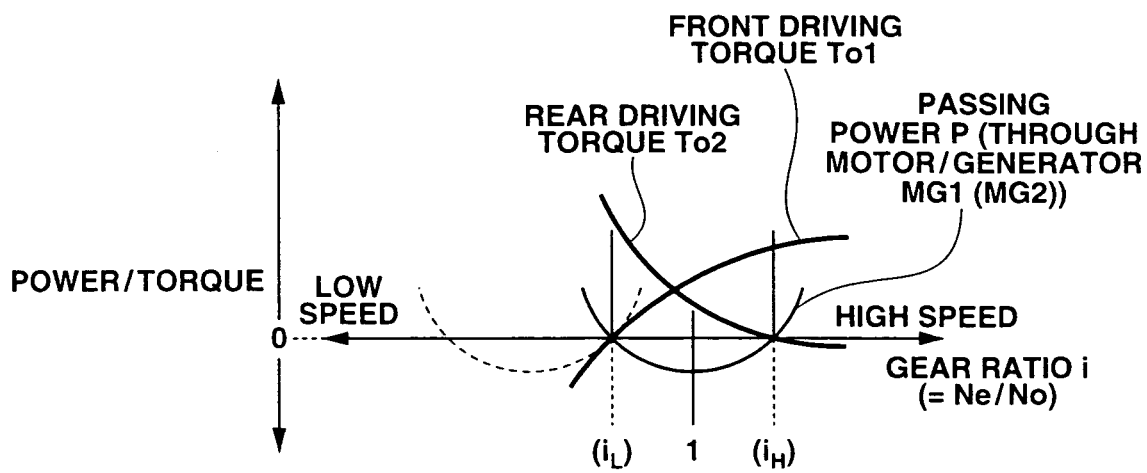
FIG. 7 is a characteristic diagram showing a distribution of the driving torque to a front axle and a rear axle, with respect to the gear ratio, in the hybrid transmission of FIG. 2.

FIG. 7 shows changes in another variables of the operating state of hybrid transmission 1 in accordance with a change in gear ratio i (Ne/No), in case Pb=0. The variables include driving torques To1, To2 of output shafts Out1, Out2, and passing power P.

The operating state of hybrid transmission 1 shown in FIG. 3 is in the medium speed range with a gear ratio between gear ratios $i_L$ and $i_H$. In this range, second motor/generator MG2 is energized by first motor/generator MG1, to retain stable the operating state of hybrid transmission 1 without power supply from battery 25.

The operating state of hybrid transmission 1 shown in FIG. 4 is in the low speed range with a gear ratio higher than gear ratio $i_L$. In this range, first motor/generator MG1 and second motor/generator MG2 both function as a generator, to retain stable the operating state of hybrid transmission 1 without power supply from battery 25. In this low speed range, however, torque Tm2 of second motor/generator MG2 or rotational speed Nm1 of first motor/generator MG1 needs to be large. Motor/generators MG1, MG2 needs to be upsized to satisfy this requirement.

The operating state of hybrid transmission 1 shown in FIG. 5 is in the high speed range with a gear ratio lower than gear ratio $i_H$. In this range, first motor/generator MG1 and second motor/generator MG2 both function as a motor, to retain stable the operating state of hybrid transmission 1 without power supply from battery 25. In this range of the gear ratio, however, torque Tm1 of first motor/generator MG1 or rotational speed Nm2 of second motor/generator MG2 needs to be large. Motor/generators MG1, MG2 needs to be upsized to satisfy this requirement.

In the speed range between gear ratios $i_L$ and $i_H$, the operating state of hybrid transmission 1 is retained stable without power supply from battery 25, resulting in downsizing of battery 25. In addition, rotational speeds Nm1, Nm2, and torques Tm1, Tm2, of motor/generators MG1, MG2 are small, as shown in FIG. 6, resulting in downsizing of motor/generators MG1, MG2. Therefore, a gear ratio between gear ratios $i_L$, and $i_H$ is employed in a normal driving condition. Gear ratios out of this range may be employed unless desired rotational speeds and torques exceed the capacity of motor/generators MG1, MG2.

Calculated from equations (14) and (15), driving torques To1, To2 are shown in FIG. 7. With the gear ratio between gear ratio $i_L$ and gear ratio $i_H$, hybrid transmission 1 employs a front drive mode in accordance with a higher gear ratio, and a rear drive mode or a four-wheel drive mode in accordance with a lower gear ratio. In this manner, hybrid transmission 1 provides a preferable distribution of the driving torque with respect to the gear ratio.

In the shown embodiment, front and rear driving torques are output from first ring gear Rf and second ring gear Rr of via output shafts Out1, Out2. Accordingly, four-wheel drive mode is achieved without an additional motor. This allows using a typical vehicle floor as a four-wheel drive hybrid vehicle.

An arbitrary operating state of hybrid transmission 1 is retained stable by controlling motor/generators MG1, MG2, and engine ENG. Accordingly, driving torques To1, To2 of output shafts Out1, Out2 are determined as desired, so that there is no difference in the ability of driving wheels between front and rear driving axles. Therefore, this hybrid transmission bears a great flexibility in distribution of driving torque.

Figure 8:
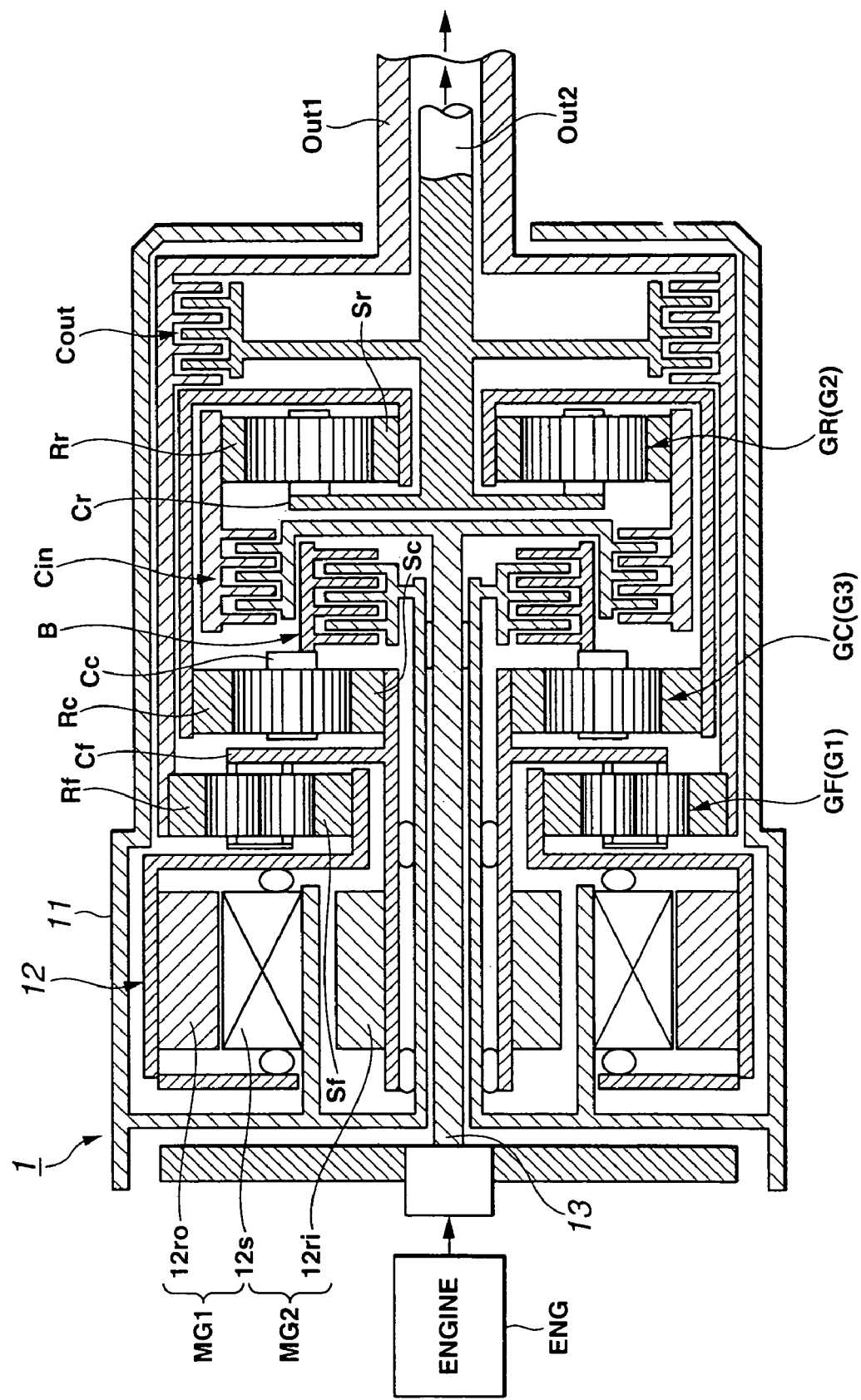
FIG. 8 is a schematic diagram showing a longitudinal sectional view of a hybrid transmission in accordance with a second embodiment of the present invention.

Referring now to FIG. 8, there is shown a hybrid transmission in accordance with a second embodiment of the present invention. Hybrid transmission 1 includes front planetary gearset GF, rear planetary gearset GR, and a central planetary gearset GC mounted coaxially with and between front planetary gearset GF and rear planetary gearset GR. Front planetary gearset GF is a double-pinion planetary gearset, serving as a first differential device G1 including three major rotating members with two degrees of freedom. Rear planetary gearset GR is a simple planetary gearset, serving as a second differential device G2 including three major rotating members with two degrees of freedom. Central planetary gearset GC is a simple planetary gearset, serving as a third differential device G3 including three major rotating members with two degrees of freedom. More specifically, front planetary gearset GF includes three major rotating members of a first sun gear Sf as a third rotating member, a first ring gear Rf as a second rotating member, and a first planet-pinion carrier Cf as a first rotating member. Rear planetary gearset GR includes three major rotating members of a second sun gear Sr as a first rotating member, a second ring gear Rr as a third rotating member, and a second planet-pinion carrier Cr as a second rotating member. Central planetary gearset GC includes three major rotating members of a third sun gear Sc, a third ring gear Rc, and a third planet-pinion carrier Cc. Rotation of engine ENG is input to input shaft 13. Between input shaft 13 and second ring gear Rr is selectively connected engine clutch Cin.

First ring gear Rf is connected to a tubular first output shaft Out1 mounted coaxially with input shaft 13 and extending outward through the rear end of transmission housing 11. Second planet-pinion carrier Cr is connected to a second output shaft Out2 extending through the bore of first output shaft Out1 and outward through the rear end of transmission housing 11. Between first output shaft Out1 and second output shaft Out2 is selectively connected an output clutch Cout, to regulate the relative rotation between them to zero.

Hybrid transmission 1 includes compound-current double-layer motor 12 as shown in FIG. 2. In contrast to the first embodiment, stator 12s and outer rotor 12ro serve for a first motor/generator MG1, and stator 12s and inner rotor 12ri serve for a second motor/generator MG2. First motor/generator MG1 (or outer rotor 12ro) is connected to first sun gear Sf. Second motor/generator MG2 (or inner rotor 12ri) is connected to third sun gear Sc. Third sun gear Sc is rigidly connected to first planet-pinion carrier Cf. Third ring gear Rc is rigidly connected to second sun gear Sr. Third planet-pinion carrier Cc is selectively held against rotation by brake B.

Figure 9:
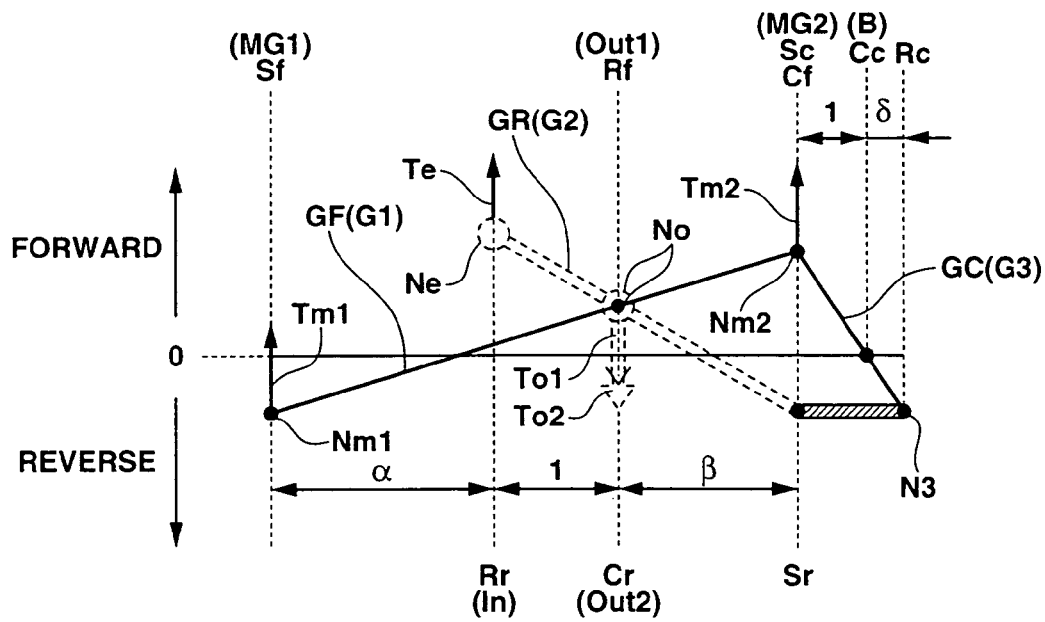
FIG. 9 is a lever diagram showing a state in which the hybrid transmission of FIG. 8 operates in a medium speed range.

FIG. 9 shows a lever diagram in accordance with an operating state of hybrid transmission 1 of FIG. 8. In front planetary gearset GF as first differential device G1, the rotational speed varies monotonously in order of first sun gear Sf, first ring gear Rf, and first planet-pinion carrier Cf. In other words, first sun gear Sf, first ring gear Rf, and first planet-pinion carrier Cf have an extreme rotational speed, an intermediate rotational speed, and another extreme rotational speed, among the three rotating members of front planetary gearset GF, respectively. In rear planetary gearset GR as second differential device G2, the rotational speed varies monotonously in order of second ring gear Rr, second planet-pinion carrier Cr, and second sun gear Sr. In other words, second ring gear Rr, second planet-pinion carrier Cr, and second sun gear Sr have an extreme rotational speed, an intermediate rotational speed, and another extreme rotational speed, among the three rotating members of rear planetary gearset GR, respectively. In central planetary gearset GC as third differential device G3, rotational speed varies monotonously in order of third sun gear Sc, third planet-pinion carrier Cc, and third ring gear Rc. In other words, third sun gear Sc, third planet-pinion carrier Cc, and third ring gear Rc have an extreme rotational speed, an intermediate rotational speed, and another extreme rotational speed, among the three rotating members of central planetary gearset GC, respectively. First ring gear Rf is connected to first output shaft Out1, while second planet-pinion carrier Cr is connected to second output shaft Out2. Output clutch Cout selectively connects and disconnects first output shaft Out1 and second output shaft Out2, to establish and to release a differential lock. First sun gear Sf is connected to first motor/generator MG1 (or outer rotor 12ro). Second ring gear Rr is connected to an input In from engine ENG (or input shaft 13) via engine clutch Cin. Third sun gear Sc is connected to second motor/generator MG2 (or inner rotor 12ri). Second sun gear Sr is connected to third ring gear Rc. First planet-pinion carrier Cf is connected to third sun gear Sc. Third planet-pinion carrier Cc is held against rotation by brake B. In this manner, the difference in the rotational speed between second sun gear Sr and first planet-pinion carrier Cf is controlled. In other words, first planet-pinion carrier Cf is connected to second sun gear Sr for reverse rotation. Central planetary gearset GC serves as the reverse connection.

The lever diagram as shown in FIG. 9 represents an operating state of hybrid transmission 1. Relative distances between the rotating members along the horizontal axis of the lever diagram are determined by gear ratios between the rotating members of hybrid transmission 1. In the lever diagram, with the distance between second ring gear Rr and second planet-pinion carrier Cr set to 1 as a reference, the distance between second ring gear Rr and first sun gear Sf is $\alpha$, and the distance between second planet-pinion carrier Cr (first ring gear Rf) and second sun gear Sr (first planet-pinion carrier Cf) is $\beta$. With the distance between third sun gear Sc and third planet-pinion carrier Cc set to 1 as a reference, the distance between third planet-pinion carrier Cc and third ring gear Rc is $\delta$. A positive position above 0 indicates a forward (normal) rotation, while a negative position below 0 indicates a backward (reverse) rotation. In the lever diagram, torques such as torques Tm1, Tm2 of motor/generators MG1, MG2, engine torque Te, and torques To1, To2 of output shafts Out1, Out2, which are imposed on the associated rotating members, are indicated by vertical vectors. An upward vector indicates a torque to move upward the position (to positively increase the rotational speed) of a rotating member, while a downward vector indicates a torque to move downward the position (to decrease the rotational speed) of a rotating member.

Figure 10:
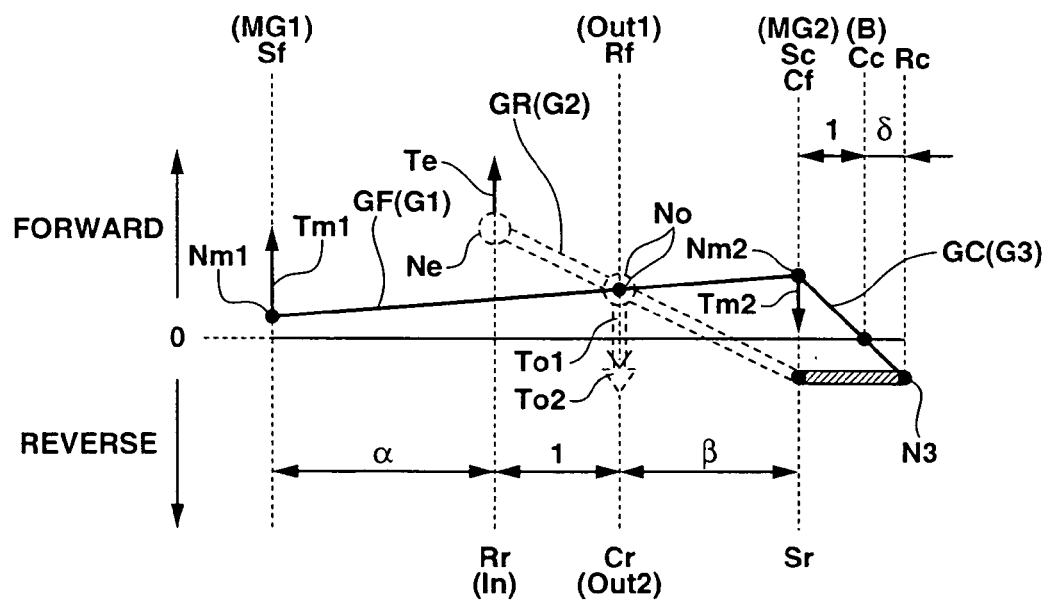
FIG. 10 is a lever diagram showing a state in which the hybrid transmission of FIG. 8 operates in a low speed range.
Figure 11:
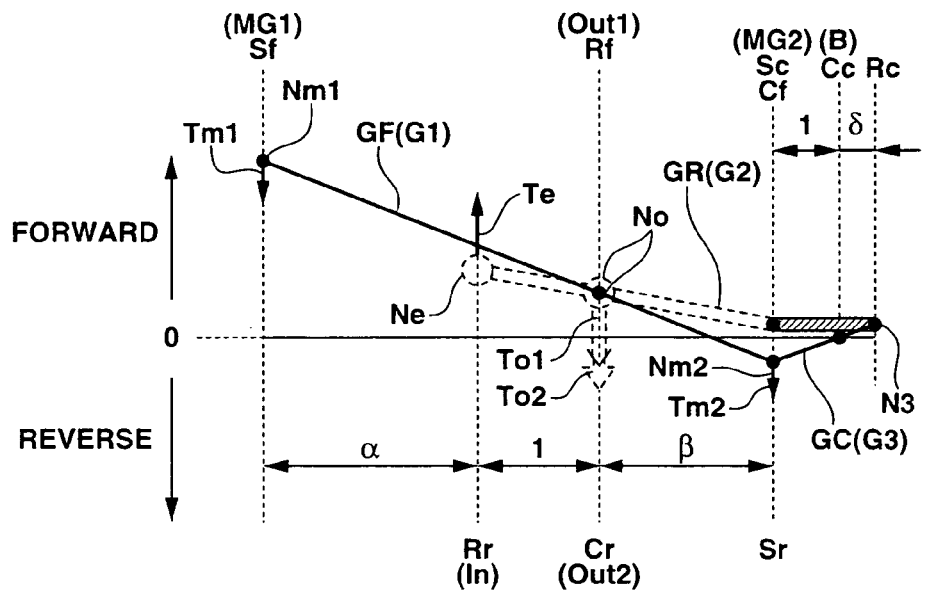
FIG. 11 is a lever diagram showing a state in which the hybrid transmission of FIG. 8 operates in a high speed range.

In the lever diagram shown in FIG. 9, front planetary gearset GF is indicated by lever GF (G1), rear planetary gearset GR is indicated by lever GR (G2), and central planetary gearset GC is indicated by lever GC (G3). While output shafts Out1 and Out2 rotate at a same rotational speed No, lever GF (G1) and lever GR (G2) intersect with each other at an angle which is produced by lever GC (G3) or by central planetary gearset GC, as shown in FIGS. 9 through 11. In the following discussion, output shafts Out1 and Out2 rotate at a same rotational speed No, so as to rotate the front and the rear wheels with no difference in the rotational speed.

Figure 13:
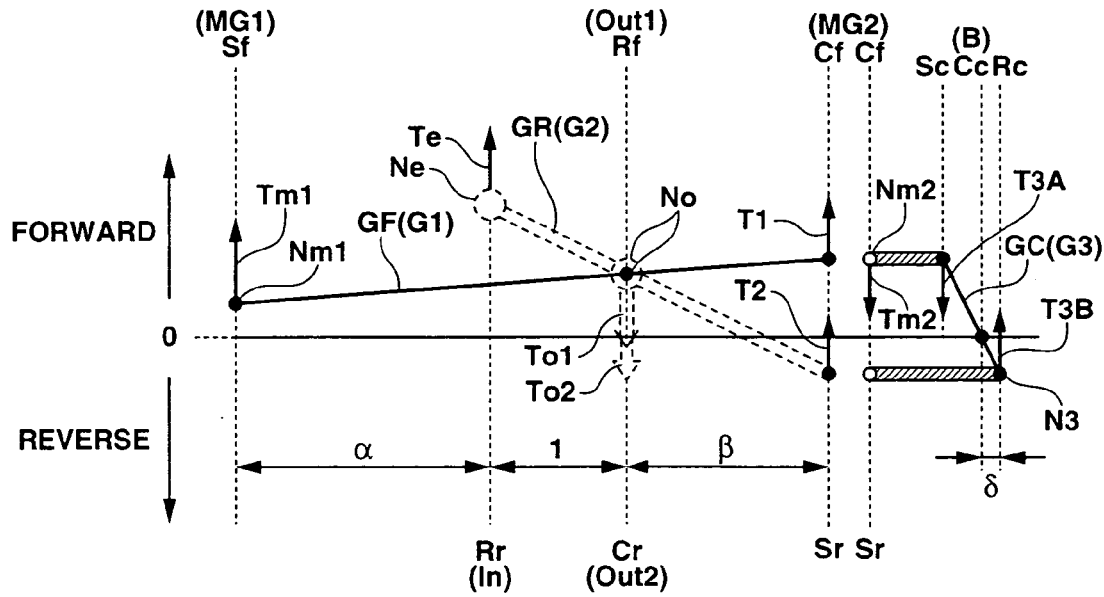
FIG. 13 is a lever diagram equivalent to those of FIGS. 9 through 11, showing definition of variables used in analysis of balances of rotational speeds and torques.

The rotational speed and the torque of each rotating member is determined, so as to keep each of lever GF (G1), lever GR (G2), lever GC (G3) in balance. The balance equations of rotational speeds and torques are the following equations (16) through (29):

$$Nm1 = \{(\alpha+1)/\beta\} \cdot Nm2 + \{1+(\alpha+1)/\beta\} \cdot No \quad (16)$$

$$Nm2 = -(1/\delta) \cdot N3 \quad (17)$$

$$N3 = -\beta \cdot Ne + (1+\beta) \cdot No \quad (18)$$

$$Te \cdot i = To \quad (19)$$

$$i = Ne/No \quad (20)$$

$$To = To1 + To2 \quad (21)$$

$$T1 = Tm2 + T3A \quad (22)$$

$$Tm1 + T1 = To1 \quad (23)$$

$$Te + T2 = To2 \quad (24)$$

$$T3A = \delta \cdot T3B \quad (25)$$

$$T3B = T2 \quad (26)$$

$$Nm1 \cdot Tm1 + Nm2 \cdot Tm2 = Pb \quad (27)$$

$$\beta \cdot T2 = Te \quad (28)$$

$$Tm1 \cdot (\alpha+1) = \beta \cdot T1 \quad (29)$$

where Pb represents an effective battery power of battery 25, and driving torques To1, To2, and To are positive in the downward direction in the lever diagram. FIG. 13 shows a lever diagram equivalent to the lever diagram shown in FIG. 9. Variables such as rotational speeds and torques in the foregoing equations are shown in FIG. 13.

The following equations (30) and (31), which are derived from equations (16) through (29), are used to calculate torques Tm1, Tm2 of motor/generators MG1, MG2. Similarly, the following equations (32) and (33) are used to calculate driving torques To1, To2 of output shafts Out1, Out2. Signals corresponding to torques Tm1, Tm2, and Te are issued to motor/generator controller 23, and to engine controller 22, respectively, to provide a transmission state.

$$Tm1 = -\{(1+\beta - i \cdot \beta)/(1+\alpha+\beta)\} \cdot Te \quad (30)$$

$$Tm2 = (Pb - Nm1 \cdot Tm1)/Nm2 \quad (31)$$

$$To1 = -[\{(1+\beta)/\beta\} - i] \cdot Te \quad (32)$$

$$To2 = \{(1+\beta)/\beta\} \cdot Te \quad (33)$$

When the operating state of hybrid transmission 1 or the gear ratio of hybrid transmission 1 is in the condition shown in FIG. 9, the levers GF (G1) and GR (G2) need to be balanced in torques. In this condition, rotational speed Nm1 of first motor/generator MG1 is set negative. Engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to third sun gear Sc and first planet-pinion carrier Cf, are determined so as to balance lever GF (G1) and lever GR (G2). More specifically, torque Tm1 needs to be a positive torque or a generator torque biasing rotational speed Nm1 of first motor/generator MG1 upward toward zero. On the other hand, torque Tm2 needs to be a positive torque or a motor torque biasing rotational speed Nm2 of second motor/generator MG2 upward away from zero.

In this manner, first motor/generator MG1 functions as a generator, and second motor/generator MG2 functions as a motor. Even while electric power is not supplied from battery 25 (Pb=0), second motor/generator MG2 can be energized with a power generated by first motor/generator MG1, to keep the balances of rotational speeds and torques of the levers, in other words, to keep stable the operating state of hybrid transmission 1 as indicated by lever GF (G1) and lever GR (G2). If the operating state of hybrid transmission 1 is not retained without power supply from battery 25, the power balance between motor/generators MG1, MG2 is slightly shifted (Pb≠0) to keep the operating state of hybrid transmission 1.

When the operating state of hybrid transmission 1 or the gear ratio of hybrid transmission 1 is in the condition shown in FIG. 10, the levers GF (G1) and GR (G2) need to be balanced in torques. This operating state of hybrid transmission 1 produces a higher speed than in FIG. 9. Engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to third sun gear Sc and first planet-pinion carrier Cf, are determined so as to balance lever GF (G1) and lever GR (G2). More specifically, torque Tm1 needs to be a positive torque or a motor torque biasing rotational speed Nm1 of first motor/generator MG1 upward away from zero. On the other hand, torque Tm2 needs to be a negative torque or a generator torque biasing rotational speed Nm2 of second motor/generator MG2 downward toward zero.

In this manner, first motor/generator MG1 functions as a motor, and second motor/generator MG2 functions as a generator. Even while electric power is not supplied from battery 25 (Pb=0), first motor/generator MG1 can be energized with a power generated by second motor/generator MG2, to keep the balances of rotational speeds and torques of the levers, in other words, to keep stable the operating state of hybrid transmission 1 as indicated by lever GF (G1) and lever GR (G2). If the operating state of hybrid transmission 1 is not retained without power supply from battery 25, the power balance between motor/generators MG1, MG2 is slightly shifted (Pb≠0) to keep the operating state of hybrid transmission 1.

When the operating state of hybrid transmission 1 or the gear ratio of hybrid transmission 1 is in the condition shown in FIG. 11, the levers GF (G1) and GR (G2) need to be balanced in torques. In this condition, rotational speed Nm2 of second motor/generator MG2 is set negative. This operating state of hybrid transmission 1 produces a higher speed than in FIGS. 9 and 10. As discussed above, engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to third sun gear Sc and first planet-pinion carrier Cf, are determined so as to balance lever GF (G1) and lever GR (G2). More specifically, torque Tm1 needs to be a negative torque or a generator torque biasing rotational speed Nm1 of first motor/generator MG1 downward toward zero. On the other hand, torque Tm2 needs to be a negative torque or a motor torque biasing rotational speed Nm2 of second motor/generator MG2 upward away from zero.

In this manner, first motor/generator MG1 functions as a generator, and second motor/generator MG2 functions as a motor. Even while electric power is not supplied from battery 25 (Pb=0), second motor/generator MG2 can be energized with a power generated by first motor/generator MG1, to keep the balances of rotational speeds and torques of the levers, in other words, to keep stable the operating state of hybrid transmission 1 as indicated by lever GF (G1) and lever GR (G2). If the operating state of hybrid transmission 1 is not retained without power supply from battery 25, the power balance between motor/generators MG1, MG2 is slightly shifted (Pb≠0) to keep the operating state of hybrid transmission 1.

Figure 12:
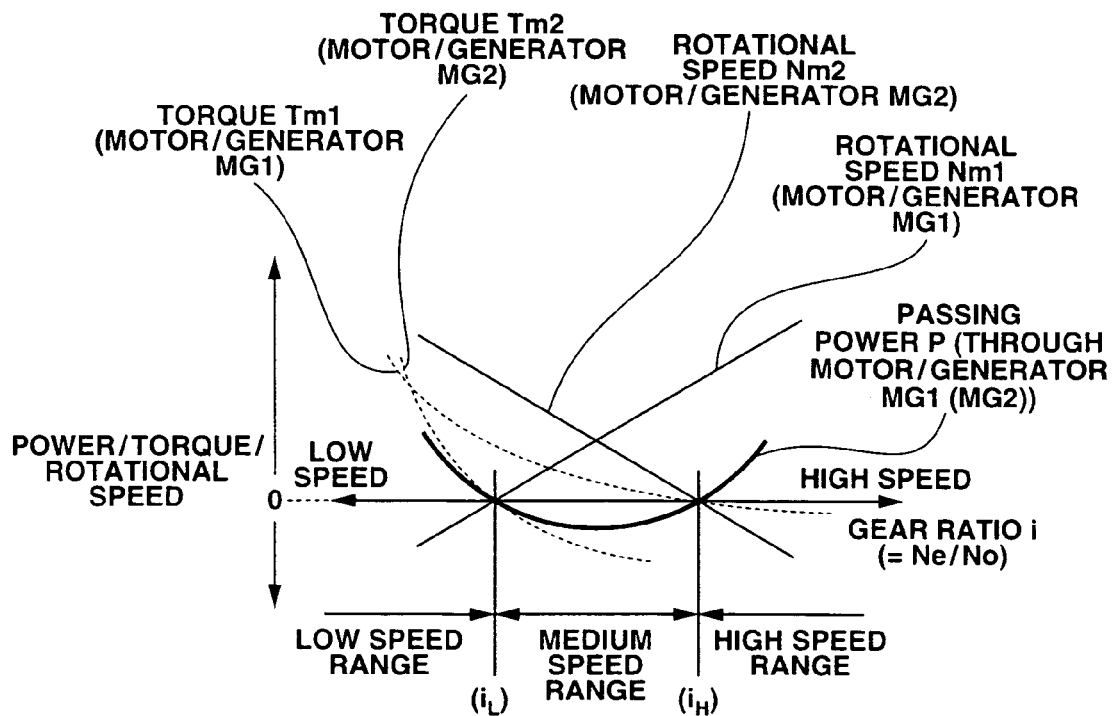
FIG. 12 is a characteristic diagram showing torques, and rotational speeds of, and a power passing through, first and second motor/generators of the hybrid transmission of FIG. 8, with respect to a gear ratio.

FIG. 12 shows changes in variables of the operating state of hybrid transmission 1 in accordance with a change in gear ratio i (Ne/No), in case Pb=0. The variables include rotational speeds Nm1, Nm2 and torques Tm1, Tm2 of motor/generators MG1, MG2, and a power passing through first motor/generator MG1. In case Pb=0, the power passing through second motor/generator MG2 has a sign opposite to and a same magnitude as the power passing through first motor/generator MG1. Passing power P is zero, at a gear ratio $i_L$ at which rotational speed Nm2 of second motor/generator MG2 is zero and torque Tm1 of first motor/generator MG1 is zero, and at a gear ratio $i_H$ at which torque Tm2 of second motor/generator MG2 is zero and rotational speed Nm1 of first motor/generator MG1 is zero.

Figure 14:
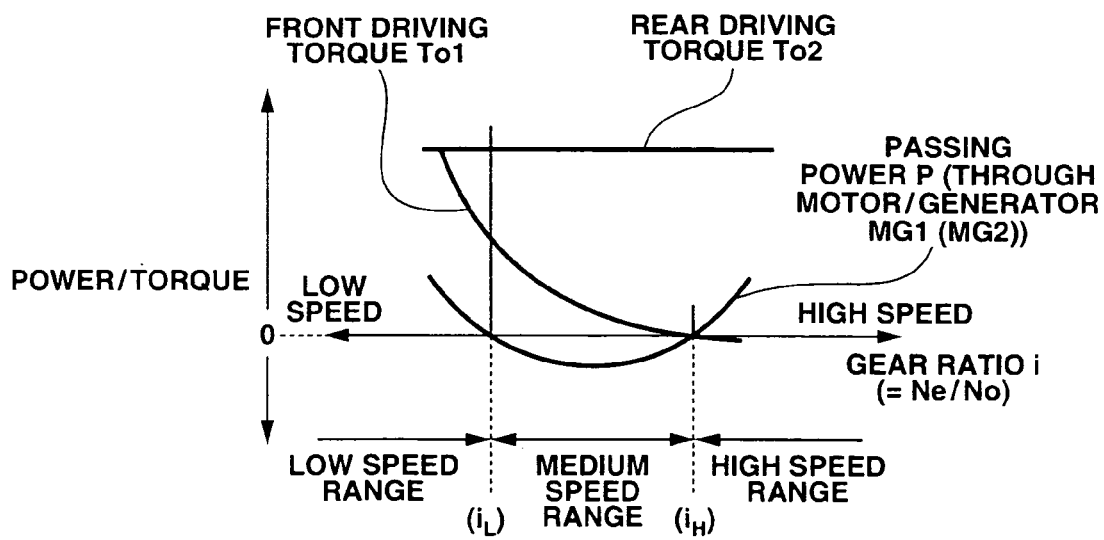
FIG. 14 is a characteristic diagram showing a distribution of the driving torque to a front axle and a rear axle, with respect to a gear ratio, in the hybrid transmission of FIG. 8.

FIG. 14 shows changes in another variables of the operating state of hybrid transmission 1 in accordance with a change in gear ratio i (Ne/No), in case Pb=0. The variables include driving torques To1, To2 of output shafts Out1, Out2, and passing power P.

The operating state of hybrid transmission 1 shown in FIG. 9 is in the low speed range with a gear ratio higher than gear ratio $i_L$. The operating state of hybrid transmission 1 shown in FIG. 10 is in the medium speed range with a gear ratio between gear ratios $i_L$ and $i_H$. The operating state of hybrid transmission 1 shown in FIG. 11 is in the high speed range with a gear ratio lower than gear ratio $i_H$. In this embodiment, in all operating conditions of hybrid transmission 1 (in all three speed ranges) shown in FIGS. 9 through 11, second motor/generator MG2 is energized by first motor/generator MG1, to retain stable the operating state of hybrid transmission 1 without power supply from battery 25. Therefore, the capacity of battery 25 may be small. Conversely, with a same capacity of battery 25, hybrid transmission 1 of this embodiment operates in a wider speed range than that of the first embodiment.

Especially in the medium speed range with a gear ratio between gear ratios $i_L$ and $i_H$, the operating state of hybrid transmission 1 is retained stable without power supply from battery 25, resulting in downsizing of battery 25. In addition, rotational speeds Nm1, Nm2, and torques Tm1, Tm2, of motor/generators MG1, MG2 are small, as shown in FIG. 12, resulting in downsizing of motor/generators MG1, MG2. Therefore, it is preferable that a gear ratio between gear ratios $i_L$ and $i_H$ is employed in a normal driving condition. Gear ratios out of this range may be employed unless desired rotational speeds and torques exceed the capacity of motor/generators MG1, MG2.

Calculated from equations (32) and (33), driving torques To1, To2 are shown in FIG. 14. With the gear ratio between gear ratio $i_L$ and gear ratio $i_H$, hybrid transmission 1 employs a four-wheel drive mode in accordance with a lower speed where a large driving force is needed, and a rear-wheel drive mode in accordance with a lower gear ratio. Thus, hybrid transmission 1 automatically selects a driving mode suitable for a driving condition.

In the shown embodiment, front and rear driving torques are output from first ring gear Rf and second ring gear Rr of via output shafts Out1, Out2. Accordingly, four-wheel drive mode is achieved without an additional motor. This allows using a typical vehicle floor as a four-wheel drive hybrid vehicle.

An arbitrary operating state of hybrid transmission 1 is retained stable by controlling motor/generators MG1, MG2, and engine ENG. Accordingly, driving torques To1, To2 of output shafts Out1, Out2 are determined as desired, so that there is no difference in the ability of driving wheels between front and rear driving axles. Therefore, this hybrid transmission bears a great flexibility in distribution of driving torque. As discussed above, this feature is provided in all the speed ranges.

Figure 15:
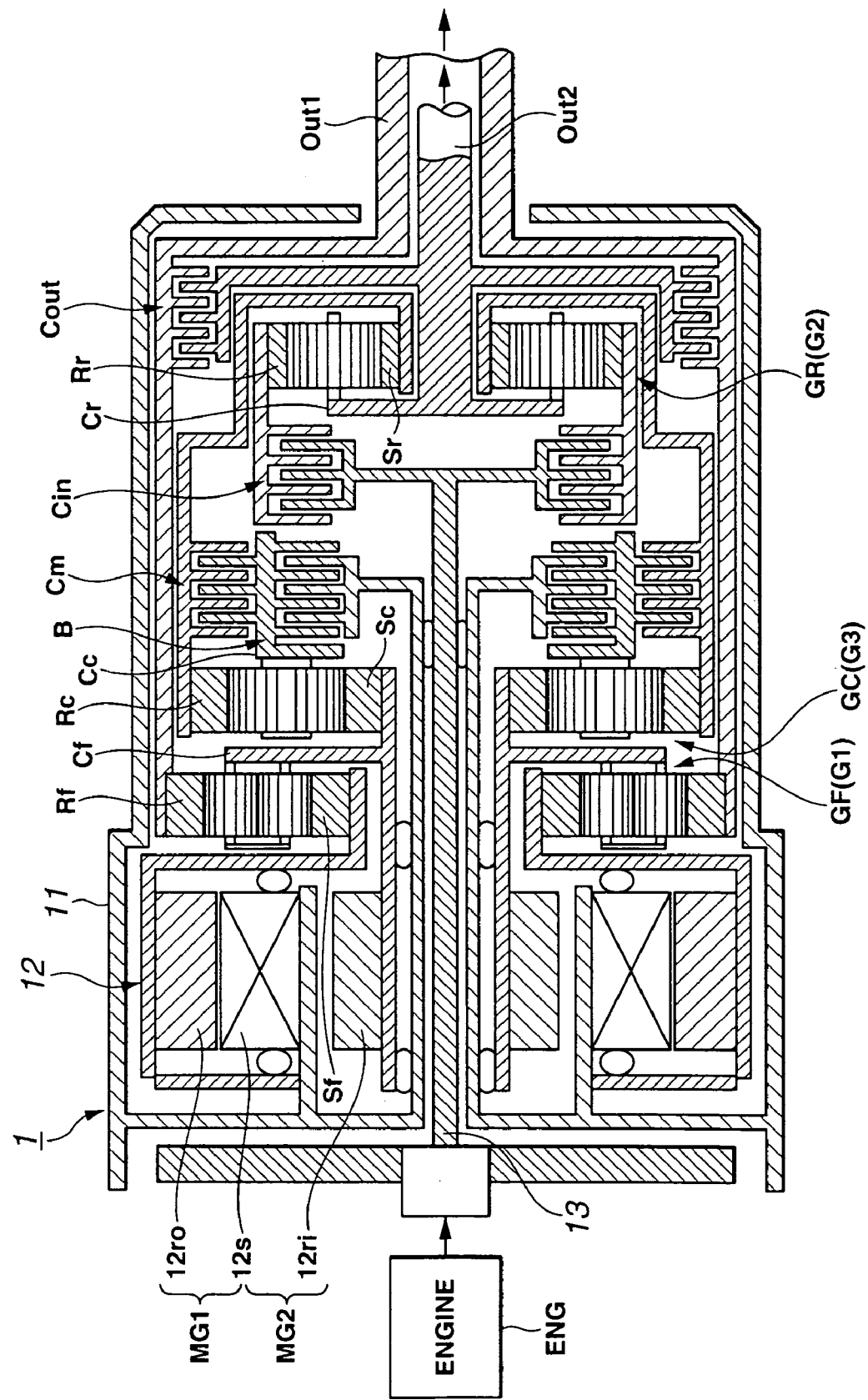
FIG. 15 is a schematic diagram showing a longitudinal sectional view of a hybrid transmission in accordance with a third embodiment of the present invention.

Referring now to FIG. 15, there is shown a hybrid transmission in accordance with a second embodiment of the present invention. Hybrid transmission 1 includes front double-pinion planetary gearset GF as first differential device G1, rear simple planetary gearset GR as second differential device G2, and central simple planetary gearset GC as third differential device G3 mounted coaxially with and between front planetary gearset GF and rear planetary gearset GR, as in the second embodiment as shown in FIG. 8. Planetary gearsets GF, GR, and GC include rotating members connected to input shaft 13, output shafts Out1, Out2, and motor/generators MG1, MG2, as in the second embodiment as shown in FIG. 8.

In addition, in this embodiment, hybrid transmission 1 includes a mode clutch Cm selectively connected between third ring gear Rc and third planet-pinion carrier Cc. In the following discussion, mode clutch Cm is constantly engaged so that the all major rotating members of central planetary gearset GC rotate solidly with each other. On the other hand, brake B is constantly released. Thus, central planetary gearset GC is configured to rotate solidly with second sun gear Sr and with first planet-pinion carrier Cf.

Figure 16:
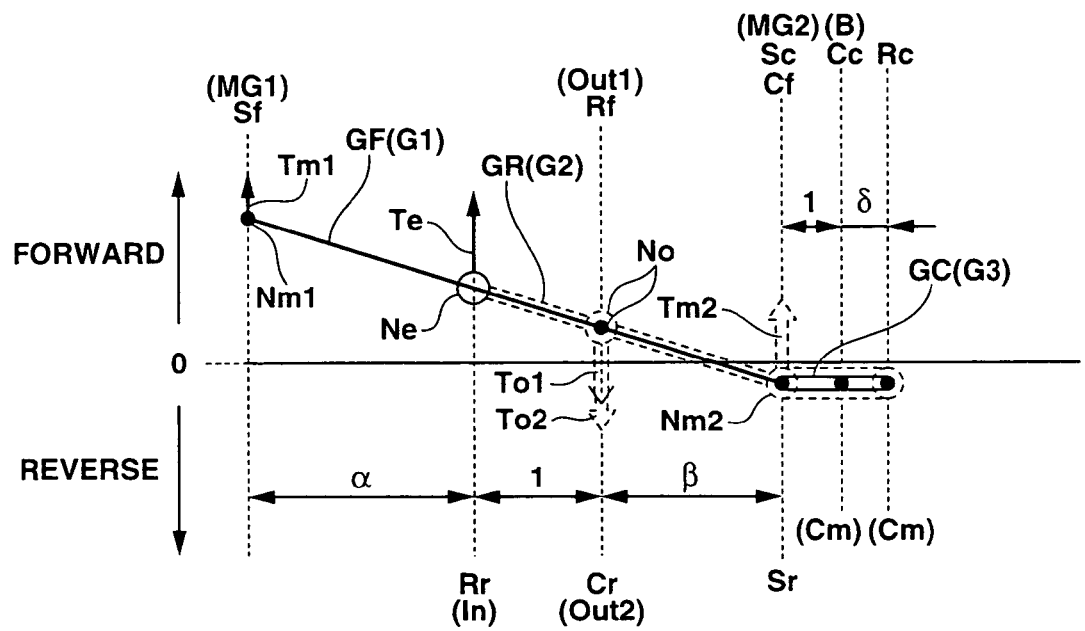
FIG. 16 is a lever diagram showing a state in which the hybrid transmission of FIG. 15 operates in a medium speed range.

FIG. 16 shows a lever diagram in accordance with an operating state of hybrid transmission 1 of FIG. 15. In contrast to the second embodiment as shown in FIGS. 9 through 11, lever GC (G3) is in a horizontal position. The operating state of hybrid transmission 1 as discussed below is determined by controlling second motor/generator MG2 to move up or down lever GC (G3), or by controlling first motor/generator MG1 to move up or down the point of first sun gear Sf. While output shafts Out1 and Out2 rotate at a same rotational speed No, lever GF (G1) and lever GR (G2) are overlapped with each other to form a straight line, as shown in FIG. 3. In the following conditions, output shafts Out1 and Out2 rotate at a same rotational speed No, so as to rotate the front and the rear wheels with no difference in the rotational speed.

When the operating state of hybrid transmission 1 or the gear ratio of hybrid transmission 1 is in the condition shown in FIG. 16, the levers GF (G1) and GR (G2) need to be balanced in torques. In this condition, rotational speed Nm2 of second motor/generator MG2 is set negative. Engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to third sun gear Sc and first planet-pinion carrier Cf, are determined so as to balance lever GF (G1) and lever GR (G2). More specifically, torque Tm1 needs to be a positive torque or a motor torque biasing rotational speed Nm1 of first motor/generator MG1 upward away from zero. On the other hand, torque Tm2 needs to be a positive torque or a generator torque biasing rotational speed Nm2 of second motor/generator MG2 upward toward zero.

In this manner, first motor/generator MG1 functions as a motor, and second motor/generator MG2 functions as a generator. Even while electric power is not supplied from battery 25 (Pb=0), first motor/generator MG1 can be energized with a power generated by second motor/generator MG2, to keep the balances of rotational speeds and torques of the levers, in other words, to keep stable the operating state of hybrid transmission 1 as indicated by lever GF (G1) and lever GR (G2). If the operating state of hybrid transmission 1 is not retained without power supply from battery 25, the power balance between motor/generators MG1, MG2 is slightly shifted (Pb≠0) to keep the operating state of hybrid transmission 1.

Figure 17:
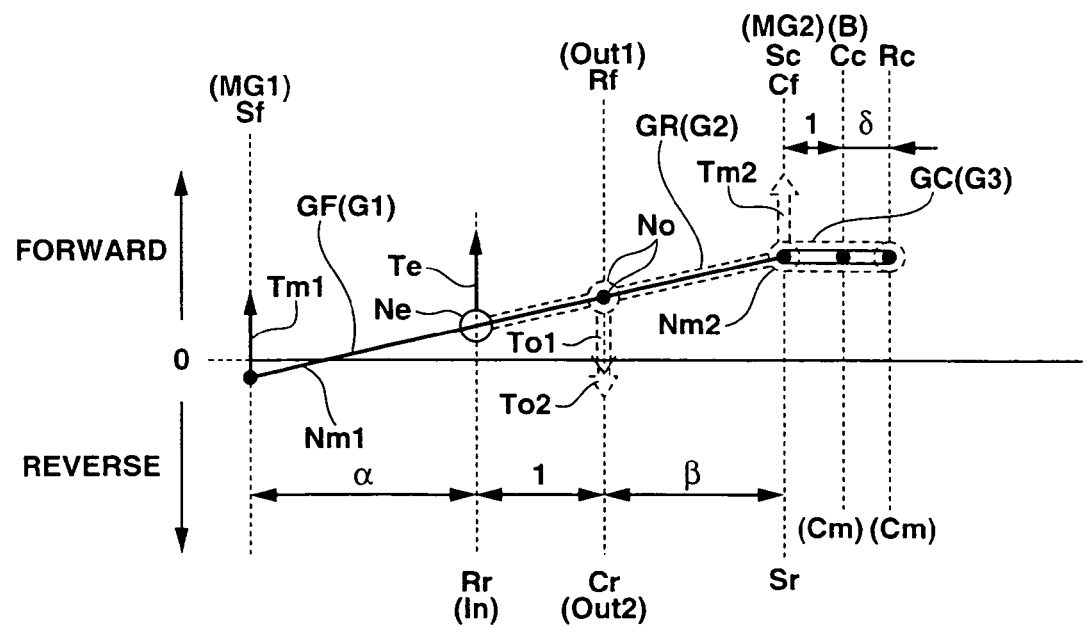
FIG. 17 is a lever diagram showing a state in which the hybrid transmission of FIG. 15 operates in a low speed range.

When the operating state of hybrid transmission 1 or the gear ratio of hybrid transmission 1 is in the condition shown in FIG. 17, the levers GF (G1) and GR (G2) need to be balanced in torques. In this condition, rotational speed Nm1 of first motor/generator MG1 is set negative. This operating state of hybrid transmission 1 produces a higher speed than in FIG. 16. Engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to third sun gear Sc and first planet-pinion carrier Cf, are determined so as to balance lever GF (G1) and lever GR (G2). More specifically, torque Tm1 needs to be a positive torque or a generator torque biasing rotational speed Nm1 of first motor/generator MG1 upward toward zero. On the other hand, torque Tm2 needs to be a positive torque or a motor torque biasing rotational speed Nm2 of second motor/generator MG2 upward away from zero.

In this manner, first motor/generator MG1 functions as a generator, and second motor/generator MG2 functions as a motor. Even while electric power is not supplied from battery 25 (Pb=0), second motor/generator MG2 can be energized with a power generated by first motor/generator MG1, to keep the balances of rotational speeds and torques of the levers, in other words, to keep stable the operating state of hybrid transmission 1 as indicated by lever GF (G1) and lever GR (G2). If the operating state of hybrid transmission 1 is not retained without power supply from battery 25, the power balance between motor/generators MG1, MG2 is slightly shifted (Pb≠0) to keep the operating state of hybrid transmission 1.

Figure 18:
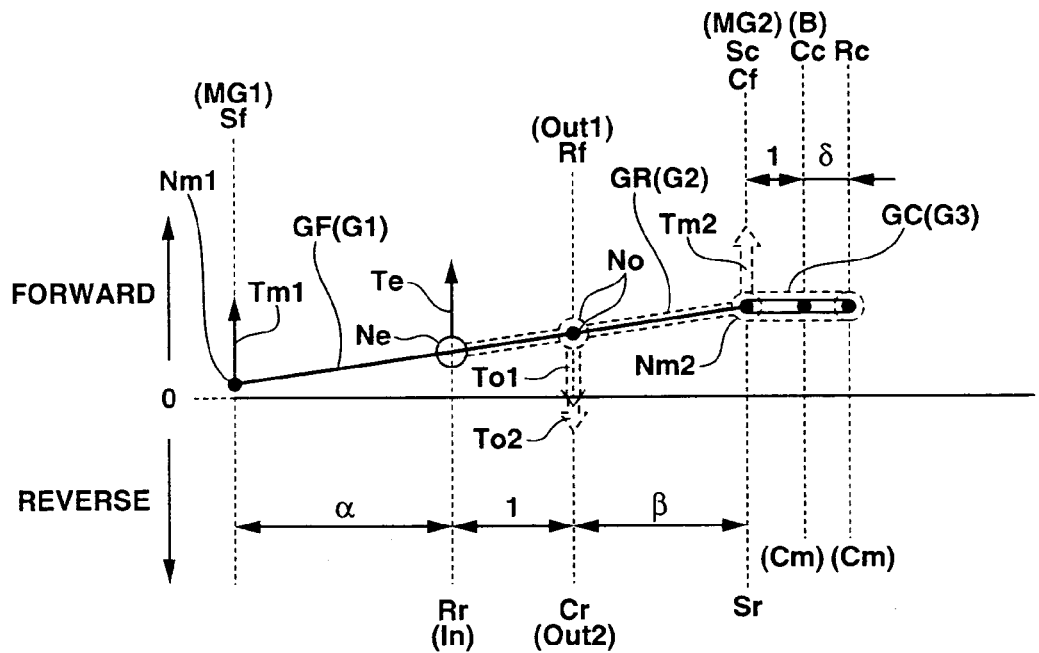
FIG. 18 is a lever diagram showing a state in which the hybrid transmission of FIG. 15 operates in a high speed range.

When the operating state of hybrid transmission 1 or the gear ratio of hybrid transmission 1 is in the condition shown in FIG. 18, the levers GF (G1) and GR (G2) need to be balanced in torques. This operating state of hybrid transmission 1 produces a medium speed between those in FIGS. 9 and 10. As discussed above, engine torque Te is a positive torque (driving torque), while torques To1, To2 are negative torques (loading torques). In this condition, torque Tm1 of first motor/generator MG1 connected to first sun gear Sf, and torque Tm2 of second motor/generator MG2 connected to third sun gear Sc and first planet-pinion carrier Cf, are determined so as to balance lever GF (G1) and lever GR (G2). More specifically, torque Tm1 needs to be a positive torque or a motor torque biasing rotational speed Nm1 of first motor/generator MG1 upward away from zero. On the other hand, torque Tm2 needs to be a positive torque or a motor torque biasing rotational speed Nm2 of second motor/generator MG2 upward away from zero.

In this manner, first motor/generator MG1 and second motor/generator MG2 both function as a motor, consuming the electric power in battery 25, to keep the balances of rotational speeds and torques of the levers, in other words, to keep stable the operating state of hybrid transmission 1 as indicated by lever GF (G1) and lever GR (G2).

Figure 19:
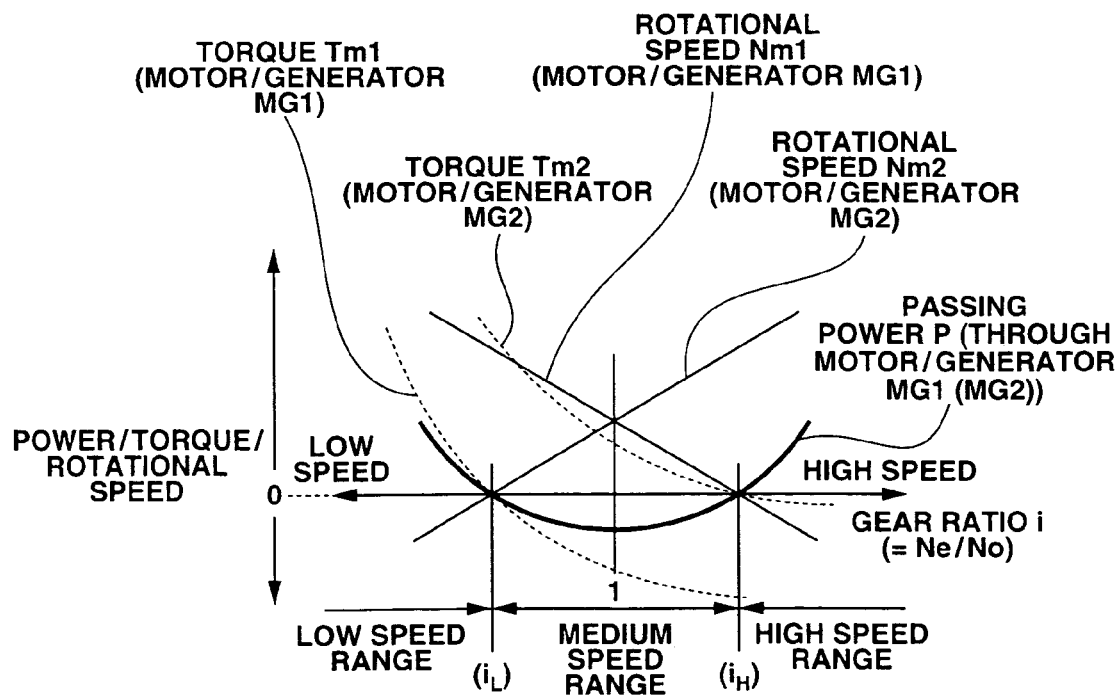
FIG. 19 is a characteristic diagram showing torques, and rotational speeds of, and a power passing through, first and second motor/generators of the hybrid transmission of FIG. 15, with respect to a gear ratio.

FIG. 19 shows changes in variables of the operating state of hybrid transmission 1 in accordance with a change in gear ratio i (Ne/No), in case Pb=0. The variables include rotational speeds Nm1, Nm2 and torques Tm1, Tm2 of motor/generators MG1, MG2, and a power passing through first motor/generator MG1. In case Pb=0, the power passing through second motor/generator MG2 has a sign opposite to and a same magnitude as the power passing through first motor/generator MG1. Passing power P is zero, at a gear ratio $i_L$ at which rotational speed Nm2 of second motor/generator MG2 is zero and torque Tm1 of first motor/generator MG1 is zero, and at a gear ratio $i_H$ at which torque Tm2 of second motor/generator MG2 is zero and rotational speed Nm1 of first motor/generator MG1 is zero.

The operating state of hybrid transmission 1 shown in FIG. 16 is in the low speed range with a gear ratio higher than gear ratio $i_L$. The operating state of hybrid transmission 1 shown in FIG. 17 is in the high speed range with a gear ratio lower than gear ratio $i_H$. The operating state of hybrid transmission 1 shown in FIG. 18 is in the medium speed range with a gear ratio between gear ratios $i_L$ and $i_H$. In this embodiment, in the operating conditions of hybrid transmission 1 (in the low and high speed ranges) as shown in FIGS. 16 and 17, one motor/generator is energized by the other motor/generator, to retain stable the operating state of hybrid transmission 1 without power supply from battery 25. Therefore, the capacity of battery 25 may be small.

In the medium speed range with a gear ratio between gear ratios $i_L$ and $i_H$, the operating state of hybrid transmission 1 is retained stable by consuming electric power in battery 25. In this rage, however, rotational speeds Nm1, Nm2, and torques Tm1, Tm2, of motor/generators MG1, MG2 are small, as shown in FIG. 19, resulting in downsizing of motor/generators MG1, MG2. Which range of gear ratio is employed is determined based on which is regarded as important the downsizing of battery 25 or the downsizing of motor/generators MG1, MG2. Hybrid transmission 1 may be operate in as wide gear ratio range as possible, unless desired rotational speeds and torques exceed the capacity of motor/generators MG1, MG2.

In the shown embodiment, front and rear driving torques are output from first ring gear Rf and second ring gear Rr of via output shafts Out1, Out2. Accordingly, four-wheel drive mode is achieved without an additional motor. This allows using a typical vehicle floor as a four-wheel drive hybrid vehicle.

An arbitrary operating state of hybrid transmission 1 is retained stable by controlling motor/generators MG1, MG2, and engine ENG. Accordingly, driving torques To1, To2 of output shafts Out1, Out2 are determined as desired, so that there is no difference in the ability of driving wheels between front and rear driving axles. Therefore, this hybrid transmission bears a great flexibility in distribution of driving torque.

In all the shown embodiments, hybrid transmission 1 includes a tubular first output shaft Out1 extending outward through the rear end of transmission housing 11, and a second output shaft Out2 extending through the bore of first output shaft Out1 and outward through the rear end of transmission housing 11, to output driving power through two drive paths from a same portion of hybrid transmission 1. This results in a compact and easily mountable four-wheel drive system. More preferably, in case hybrid transmission 1 is mounted in a longitudinal position, first output shaft Out1 may be connected to a front axle, and second output shaft Out2 may be connected to a rear axle.

In all the shown embodiments, sharing a stator, layered first and second motor/generators MG1, MG2 are coaxially mounted between engine ENG and front planetary gearset GF. Mounting two motor/generators MG1, MG2 in this manner makes hybrid transmission 1 compact so that mountability of hybrid transmission 1 is enhanced.

This application is based on a prior Japanese Patent Application No. 2003-387932 filed on Nov. 18, 2003. The entire contents of this Japanese Patent Application No. 2003-387932 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hybrid transmission for a hybrid vehicle mounting thereon three motors including an engine, a first electric motor/generator, and a second electric motor/generator, the hybrid transmission comprising:
    a first output shaft;
    a second output shaft;
    a first differential device with two degrees of freedom, including a first rotating member of the first differential device, a second rotating member of the first differential device, and a third rotating member of the first differential device;
    a second differential device with two degrees of freedom, including a first rotating member of the second differential device, a second rotating member of the second differential device, and a third rotating member of the second differential device; wherein
    the first rotating member of the first differential device is connected to the first rotating member of the second differential device, and to a first one of the three motors;
    the second rotating member of the first differential device is connected to the first output shaft;
    the second rotating member of the second differential device is connected to the second output shaft;
    the third rotating member of the first differential device is connected to a second one of the three motors;
    the third rotating member of the second differential device is connected to a third one of the three motors;
    the first output shaft is drivingly connected to one of a front axle and a rear axle of the vehicle; and
    the second output shaft is drivingly connected to the other one of the front axle and the rear axle.

2. The hybrid transmission as claimed in claim 1, wherein:
    the first rotating member of the first differential device has an extreme rotational speed among the three rotating members of the first differential device;
    the first rotating member of the second differential device has an extreme rotational speed among the three rotating members of the second differential device;
    the second rotating member of the first differential device has an intermediate rotational speed among the three rotating members of the first differential device;
    the second rotating member of the second differential device has an intermediate rotational speed among the three rotating members of the second differential device;
    the third rotating member of the first differential device has another extreme rotational speed among the three rotating members of the first differential device;
    the third rotating member of the second differential device has another extreme rotational speed among the three rotating members of the second differential device;
    the first motor is the second electric motor/generator;
    the second motor is the first electric motor/generator;
    the third motor is the engine; and
    the first rotating member of the first differential device is connected to the first rotating member of the second differential device for reverse rotation.

3. The hybrid transmission as claimed in claim 2, further comprising a third differential device serving as a reverse connection connecting the first rotating member of the first differential device and the first rotating member of the second differential device for reverse rotation.

4. The hybrid transmission as claimed in claim 3, wherein:
    the first differential device is a double-pinion planetary gearset including a first sun gear serving as the third rotating member of the first differential device, a first ring gear serving as the second rotating member of the first differential device, and a first planet-pinion carrier serving as the first rotating member of the first differential device, and is located nearer to the engine;
    the second differential device is a simple planetary gearset including a second sun gear serving as the first rotating member of the second differential device, a second ring gear serving as the third rotating member of the second differential device, and a second planet-pinion carrier serving as the second rotating member of the second differential device, and is located farer from the engine;
    the third differential device is a simple planetary gearset including a third sun gear, a third ring gear, and a third planet-pinion carrier, and is located between the first differential device and the second differential device;
    the first planet-pinion carrier is connected to the third sun gear;
    the second sun gear is connected to the third ring gear; and
    the third planet-pinion carrier is held against rotation.

5. The hybrid transmission as claimed in claim 4, further comprising a brake selectively holding against rotation the third planet-pinion carrier.

6. The hybrid transmission as claimed in claim 1, wherein:
    the first rotating member of the first differential device has an extreme rotational speed among the three rotating members of the first differential device;
    the first rotating member of the second differential device has an extreme rotational speed among the three rotating members of the second differential device;
    the second rotating member of the first differential device has an intermediate rotational speed among the three rotating members of the first differential device;
    the second rotating member of the second differential device has an intermediate rotational speed among the three rotating members of the second differential device;
    the third rotating member of the first differential device has another extreme rotational speed among the three rotating members of the first differential device;
    the third rotating member of the second differential device has another extreme rotational speed among the three rotating members of the second differential device;

the first motor is the second electric motor/generator;
the second motor is the first electric motor/generator;
the third motor is the engine; and
the first rotating member of the first differential device is connected to the first rotating member of the second differential device for solid rotation therewith.

7. The hybrid transmission as claimed in claim 6, further comprising a third differential device serving as a connection connecting the first rotating member of the first differential device and the first rotating member of the second differential device for solid rotation.

8. The hybrid transmission as claimed in claim 7, wherein:
the first differential device is a double-pinion planetary gearset including a first sun gear serving as the third rotating member of the first differential device, a first ring gear serving as the second rotating member of the first differential device, and a first planet-pinion carrier serving as the first rotating member of the first differential device, and is located nearer to the engine;
the second differential device is a simple planetary gearset including a second sun gear serving as the first rotating member of the second differential device, a second ring gear serving as the third rotating member of the second differential device, and a second planet-pinion carrier serving as the second rotating member of the second differential device, and is located farer from the engine;
the third differential device is a simple planetary gearset including a third sun gear, a third ring gear, and a third planet-pinion carrier, and is located between the first differential device and the second differential device;
the first planet-pinion carrier is connected to the third sun gear;
the second sun gear is connected to the third ring gear; and
the third planet-pinion carrier is connected to the third ring gear.

9. The hybrid transmission as claimed in claim 8, further comprising a clutch selectively connecting the third planet-pinion carrier and the third ring gear.

10. The hybrid transmission as claimed in claim 1, wherein the first output shaft is formed into a tubular shape extending outward through a rear end of a transmission housing; and the second output shaft extends through a bore of the first output shaft, and outward through the rear end of the transmission housing.

11. The hybrid transmission as claimed in claim 1, wherein the respective output shaft of the respective differential device that is connected to the engine is connected to the rear axle.

12. A hybrid transmission for a hybrid vehicle mounting thereon three motors including an engine, a first electric motor/generator, and a second electric motor/generator, the hybrid transmission comprising:
a first output shaft;
a second output shaft;
a first differential device with two degrees of freedom, including a first rotating member of the first differential device, a second rotating member of the first differential device, and a third rotating member of the first differential device;
a second differential device with two degrees of freedom, including a first rotating member of the second differential device, a second rotating member of the second differential device, and a third rotating member of the second differential device; wherein the first rotating member of the first differential device is connected to the first rotating member of the second differential device, and to a first one of the three motors;
the second rotating member of the first differential device is connected to the first output shaft;
the second rotating member of the second differential device is connected to the second output shaft;
the third rotating member of the first differential device is connected to a second one of the three motors;
the third rotating member of the second differential device is connected to a third one of the three motors;
the first rotating member of the first differential device has an intermediate rotational speed among the three rotating members of the first differential device;
the first rotating member of the second differential device has an extreme rotational speed among the three rotating members of the second differential device;
the second rotating member of the first differential device has an extreme rotational speed among the three rotating members of the first differential device;
the second rotating member of the second differential device has an intermediate rotational speed among the three rotating members of the second differential device;
the third rotating member of the first differential device has another extreme rotational speed among the three rotating members of the first differential device;
the third rotating member of the second differential device has another extreme rotational speed among the three rotating members of the second differential device;
the first motor is the engine;
the second motor is the first electric motor/generator; and
the third motor is the second electric motor/generator.

13. The hybrid transmission as claimed in claim 12, wherein:
the first differential device is a simple planetary gearset including a first sun gear serving as the third rotating member of the first differential device, a first ring gear serving as the second rotating member of the first differential device, and a first planet-pinion carrier serving as the first rotating member of the first differential device, and is located nearer to the engine; and
the second differential device is a double-pinion planetary gearset including a second sun gear serving as the third rotating member of the second differential device, a second ring gear serving as the second rotating member of the second differential device, and a second planet-pinion carrier serving as the first rotating member of the second differential device, and is located farer from the engine.

14. The hybrid transmission as claimed in claim 13, wherein the first output shaft is formed into a tubular shape extending outward through a rear end of a transmission housing; and the second output shaft extends through a bore of the first output shaft, and outward through the rear end of the transmission housing.

15. A hybrid transmission for a hybrid vehicle mounting thereon three motors including an engine, a first electric motor/generator, and a second electric motor/generator, the hybrid transmission comprising:
a first output shaft;
a second output shaft;
first differential means with two degrees of freedom for differential rotational movement transfer including a first rotating member of the first differential means, a second rotating member of the first differential means, and a third rotating member of the first differential means;

second differential means with two degrees of freedom for differential rotational movement transfer including a first rotating member of the second differential means, a second rotating member of the second differential means, and a third rotating member of the second differential means; wherein the first rotating member of the first differential means is connected to the first rotating member of the second differential means, and to a first one of the three motors;

the second rotating member of the first differential means is connected to the first output shaft;

the second rotating member of the second differential means is connected to the second output shaft;

the third rotating member of the first differential means is connected to a second one of the three motors;

the third rotating member of the second differential means is connected to a third one of the three motors;

the first output shaft is drivingly connected to one of a front axle and a rear axle of the vehicle; and the second output shaft is drivingly connected to the other one of the front axle and the rear axle.

16. A hybrid transmission for a hybrid vehicle mounting thereon three motors including an engine, a first electric motor/generator, and a second electric motor/generator, the hybrid transmission comprising:

a first output shaft;

a second output shaft;

a first differential device with two degrees of freedom, including a first rotating member of the first differential device, a second rotating member of the first differential device, and a third rotating member of the first differential device;

a second differential device with two degrees of freedom, including a first rotating member of the second differential device, a second rotating member of the second differential device, and a third rotating member of the second differential device; wherein the first rotating member of the first differential device is connected to the first rotating member of the second differential device, and to a first one of the three motors;

the second rotating member of the first differential device is connected to the first output shaft;

the second rotating member of the second differential device is connected to the second output shaft;

the third rotating member of the first differential device is connected to a second one of the three motors;

the third rotating member of the second differential device is connected to a third one of the three motors; and the first electric motor/generator and the second electric motor/generator are integrally formed, sharing a stator.

17. The hybrid transmission as claimed in claim 16, wherein:

the first rotating member of the first differential device has an extreme rotational speed among the three rotating members of the first differential device;

the first rotating member of the second differential device has an extreme rotational speed among the three rotating members of the second differential device;

the second rotating member of the first differential device has an intermediate rotational speed among the three rotating members of the first differential device;

the second rotating member of the second differential device has an intermediate rotational speed among the three rotating members of the second differential device;

the third rotating member of the first differential device has another extreme rotational speed among the three rotating members of the first differential device;

the third rotating member of the second differential device has another extreme rotational speed among the three rotating members of the second differential device;

the first motor is the second electric motor/generator;

the second motor is the first electric motor/generator;

the third motor is the engine; and the first rotating member of the first differential device is connected to the first rotating member of the second differential device for reverse rotation.

18. The hybrid transmission as claimed in claim 17, further comprising a third differential device serving as a reverse connection connecting the first rotating member of the first differential device and the first rotating member of the second differential device for reverse rotation.

19. The hybrid transmission as claimed in claim 18, wherein:

the first differential device is a double-pinion planetary gearset including a first sun gear serving as the third rotating member of the first differential device, a first ring gear serving as the second rotating member of the first differential device, and a first planet-pinion carrier serving as the first rotating member of the first differential device, and is located nearer to the engine;

the second differential device is a simple planetary gearset including a second sun gear serving as the first rotating member of the second differential device, a second ring gear serving as the third rotating member of the second differential device, and a second planet-pinion carrier serving as the second rotating member of the second differential device, and is located farer from the engine;

the third differential device is a simple planetary gearset including a third sun gear, a third ring gear, and a third planet-pinion carrier, and is located between the first differential device and the second differential device;

the first planet-pinion carrier is connected to the third sun gear;

the second sun gear is connected to the third ring gear; and the third planet-pinion carrier is held against rotation.

20. The hybrid transmission as claimed in claim 19, further comprising a brake selectively holding against rotation the third planet-pinion carrier.

21. The hybrid transmission as claimed in claim 16, wherein:

the first rotating member of the first differential device has an extreme rotational speed among the three rotating members of the first differential device;

the first rotating member of the second differential device has an extreme rotational speed among the three rotating members of the second differential device;

the second rotating member of the first differential device has an intermediate rotational speed among the three rotating members of the first differential device;

the second rotating member of the second differential device has an intermediate rotational speed among the three rotating members of the second differential device;

the third rotating member of the first differential device has another extreme rotational speed among the three rotating members of the first differential device;

the third rotating member of the second differential device has another extreme rotational speed among the three rotating members of the second differential device;

the first motor is the second electric motor/generator;

the second motor is the first electric motor/generator;

the third motor is the engine; and the first rotating member of the first differential device is connected to the first rotating member of the second differential device for solid rotation therewith.

22. The hybrid transmission as claimed in claim 21, further comprising a third differential device serving as a connection connecting the first rotating member of the first differential device and the first rotating member of the second differential device for solid rotation.

23. The hybrid transmission as claimed in claim 22, wherein:

the first differential device is a double-pinion planetary gearset including a first sun gear serving as the third rotating member of the first differential device, a first ring gear serving as the second rotating member of the first differential device, and a first planet-pinion carrier serving as the first rotating member of the first differential device, and is located nearer to the engine;

the second differential device is a simple planetary gearset including a second sun gear serving as the first rotating member of the second differential device, a second ring gear serving as the third rotating member of the second differential device, and a second planet-pinion carrier serving as the second rotating member of the second differential device, and is located farer from the engine;

the third differential device is a simple planetary gearset including a third sun gear, a third ring gear, and a third planet-pinion carrier, and is located between the first differential device and the second differential device;

the first planet-pinion carrier is connected to the third sun gear;

the second sun gear is connected to the third ring gear; and the third planet-pinion carrier is connected to the third ring gear.

24. The hybrid transmission as claimed in claim 23, further comprising a clutch selectively connecting the third planet-pinion carrier and the third ring gear.

25. The hybrid transmission as claimed in claim 16, wherein the first output shaft is formed into a tubular shape extending outward through a rear end of a transmission housing; and the second output shaft extends through a bore of the first output shaft, and outward through the rear end of the transmission housing.

* * * * *